US012566789B2

(12) United States Patent
Narsinghani et al.

(10) Patent No.: US 12,566,789 B2
(45) Date of Patent: Mar. 3, 2026

(54) DOCUMENT PROCESSING SERVICE USING CUSTOMIZABLE SCHEMAS

(71) Applicant: SAP SE, Walldorf (DE)

(72) Inventors: Komal Narsinghani, Bangalore (IN); Prasanna Bhat Mavinakuli, Sagar Tq. (IN)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 18/671,713

(22) Filed: May 22, 2024

(65) Prior Publication Data

US 2025/0363159 A1      Nov. 27, 2025

(51) Int. Cl.
| | |
|---|---|
| *G06F 16/00* | (2019.01) |
| *G06F 16/334* | (2025.01) |
| *G06F 16/358* | (2025.01) |
| *G06V 30/412* | (2022.01) |
| *G06V 30/413* | (2022.01) |

(52) U.S. Cl.
CPC ........ *G06F 16/358* (2019.01); *G06F 16/3344* (2019.01); *G06V 30/412* (2022.01); *G06V 30/413* (2022.01)

(58) Field of Classification Search
CPC ........................... G06F 16/358; G06F 16/3344
USPC ........................................................ 707/736
See application file for complete search history.

(56) References Cited

U.S. PATENT DOCUMENTS

| | | | |
|---|---|---|---|
| 11,556,558 | B2 | 1/2023 | Kabra et al. |
| 12,400,465 | B2 | 8/2025 | Jayaram et al. |
| 2024/0249543 | A1 | 7/2024 | Jayaram et al. |
| 2025/0068847 | A1* | 2/2025 | Perot ............... G06V 30/19147 |
| 2025/0156463 | A1* | 5/2025 | Rosa ................... G06F 16/3344 |

OTHER PUBLICATIONS

U.S. Appl. No. 18/100,334, filed Jan. 23, 2023, Customizable Data Extraction Service.
"Document Information Extraction", SAP SE, [Online]. Retrieved from the Internet: <URL: https://help.sap.com/docs/DOCUMENT_INFORMATION_EXTRACTION/5fa7265b9ff64d73bac7cec61ee55ae6/020ab638cfa84eb08caa26f5dbf3b8ef.html>, (Dec. 7, 2022), 200 pgs.
"U.S. Appl. No. 18/100,334, Notice of Allowance mailed Jul. 24, 2025", 9 pgs.

* cited by examiner

*Primary Examiner* — Chelcie L Daye
(74) *Attorney, Agent, or Firm* — SCHWEGMAN LUNDBERG & WOESSNER, P.A.

(57)                    ABSTRACT

Systems and methods described herein provide a document processing service using customizable schemas. First user input includes a document and second user input identifies a classification schema. The classification schema is retrieved to obtain first prompt content. Prompt data is generated. The prompt data includes the first prompt content and second prompt content that includes a document classification instruction. The prompt data and document content of the document are processed by a large language model to obtain a classification result for the document. The classification result is presented via a user interface at a user device.

20 Claims, 10 Drawing Sheets

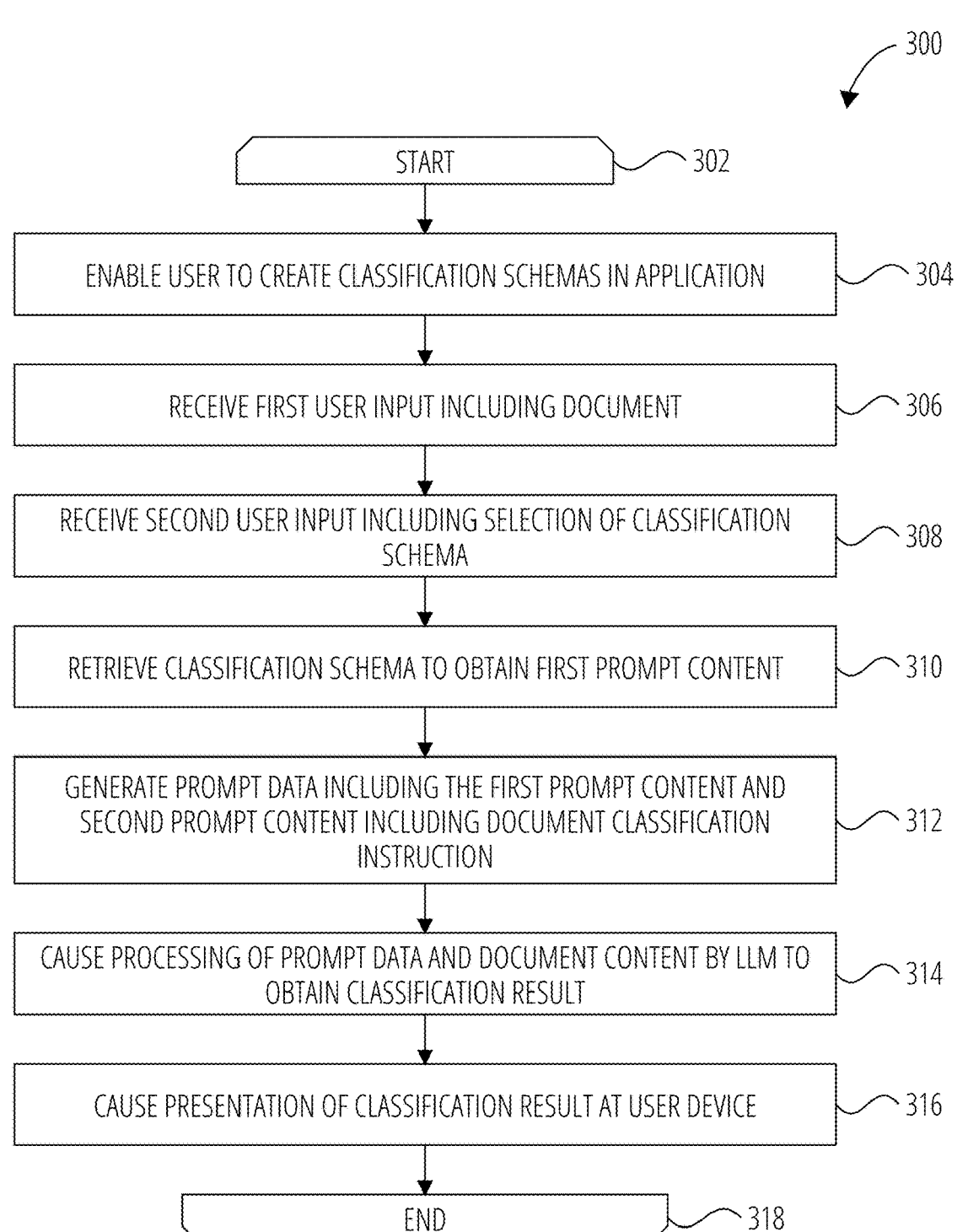

300

START — 302

ENABLE USER TO CREATE CLASSIFICATION SCHEMAS IN APPLICATION — 304

RECEIVE FIRST USER INPUT INCLUDING DOCUMENT — 306

RECEIVE SECOND USER INPUT INCLUDING SELECTION OF CLASSIFICATION SCHEMA — 308

RETRIEVE CLASSIFICATION SCHEMA TO OBTAIN FIRST PROMPT CONTENT — 310

GENERATE PROMPT DATA INCLUDING THE FIRST PROMPT CONTENT AND SECOND PROMPT CONTENT INCLUDING DOCUMENT CLASSIFICATION INSTRUCTION — 312

CAUSE PROCESSING OF PROMPT DATA AND DOCUMENT CONTENT BY LLM TO OBTAIN CLASSIFICATION RESULT — 314

CAUSE PRESENTATION OF CLASSIFICATION RESULT AT USER DEVICE — 316

END — 318

START ~402

RECEIVE CLASSIFICATION RESULT ~404

IDENTIFY DOCUMENT TYPE BASED ON CLASSIFICATION RESULT ~406

SELECT DATA EXTRACTION SCHEMA CORRESPONDING TO DOCUMENT TYPE ~408

IDENTIFY FEATURES IN DOCUMENT ~410

EXECUTE ONE OR MORE EXTRACTION MODELS TO EXTRACT DATA OBJECTS ASSOCIATED WITH THE FEATURES ~412

CAUSE PRESENTATION OF EXTRACTED DATA OBJECTS AT USER DEVICE ~414

END ~416

500

START 502

RECEIVE DOCUMENT FROM USER DEVICE VIA USER INTERFACE 504

PERFORM DOCUMENT CLASSIFICATION USING LLM 506

DOCUMENT TYPE SUPPORTED BY ONE OR MORE EXTRACTION MODELS? 508

PERFORM EXTRACTION USING LLM 510

N

Y

PERFORM EXTRACTION USING ONE OR MORE EXTRACTION MODELS 512

ANY EXTRACTION RESULTS REJECTED? 514

N

Y

PERFORM AT LEAST PARTIAL EXTRACTION USING LLM 516

END 518

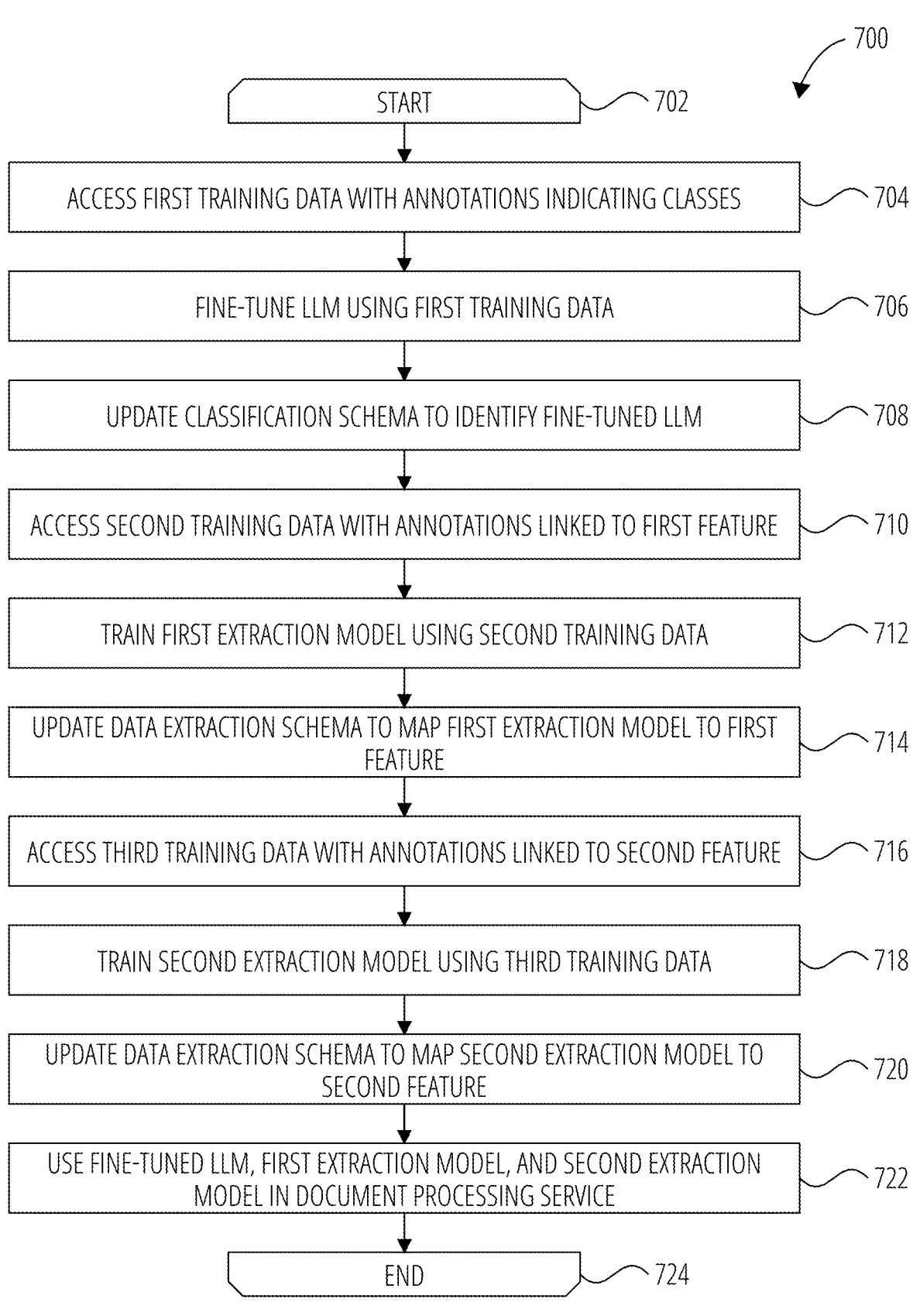

700

START ~702

ACCESS FIRST TRAINING DATA WITH ANNOTATIONS INDICATING CLASSES ~704

FINE-TUNE LLM USING FIRST TRAINING DATA ~706

UPDATE CLASSIFICATION SCHEMA TO IDENTIFY FINE-TUNED LLM ~708

ACCESS SECOND TRAINING DATA WITH ANNOTATIONS LINKED TO FIRST FEATURE ~710

TRAIN FIRST EXTRACTION MODEL USING SECOND TRAINING DATA ~712

UPDATE DATA EXTRACTION SCHEMA TO MAP FIRST EXTRACTION MODEL TO FIRST FEATURE ~714

ACCESS THIRD TRAINING DATA WITH ANNOTATIONS LINKED TO SECOND FEATURE ~716

TRAIN SECOND EXTRACTION MODEL USING THIRD TRAINING DATA ~718

UPDATE DATA EXTRACTION SCHEMA TO MAP SECOND EXTRACTION MODEL TO SECOND FEATURE ~720

USE FINE-TUNED LLM, FIRST EXTRACTION MODEL, AND SECOND EXTRACTION MODEL IN DOCUMENT PROCESSING SERVICE ~722

END ~724

FIG. 7

DOCUMENT PROCESSING SERVICE USING CUSTOMIZABLE SCHEMAS

TECHNICAL FIELD

The subject matter disclosed herein generally relates to automated document processing. More specifically, but not exclusively, the present disclosure relates to systems and methods to use custom schemas and machine learning techniques for one or both of document classification and data extraction.

BACKGROUND

Many enterprises face difficulties in managing the vast and diverse array of documents generated from an increasing number of business transactions. In particular, technical challenges can arise with respect to classifying documents in a manner that is both efficient and accurate. Furthermore, it may be technically challenging for an enterprise to streamline the extraction of data objects that are of interest to it (e.g., values for specific fields) from the documents before or after they are classified.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

FIG. 3 is a flowchart illustrating operations of a method suitable for performing automated document classification, according to some examples.

FIG. 7 is a flowchart illustrating operations of a method suitable for training an LLM and multiple extraction models, according to some examples.

DETAILED DESCRIPTION

Figure 1:
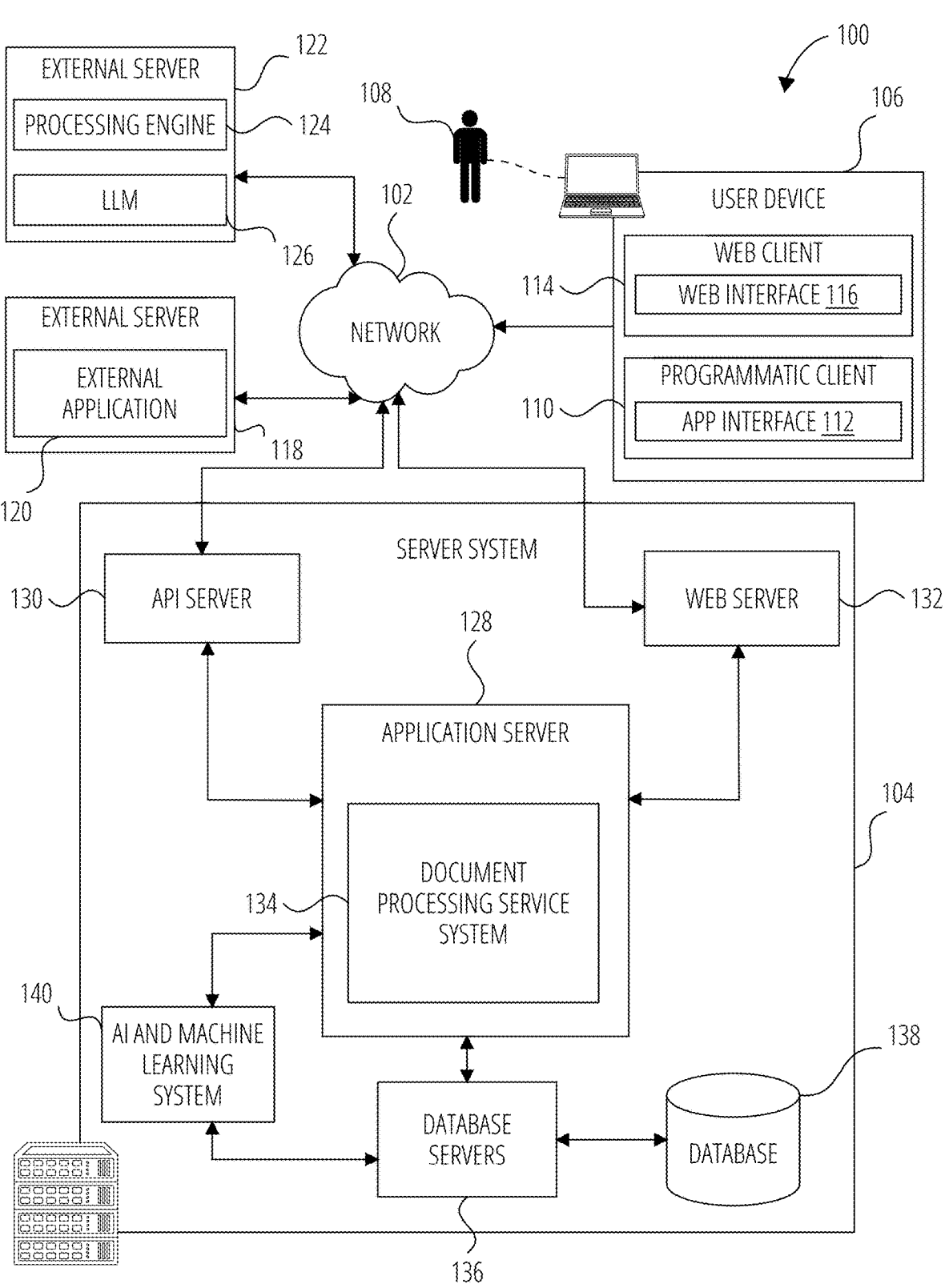
FIG. 1 is a diagrammatic representation of a network environment that includes a document processing service system, according to some examples.

A "data object," as used herein, may include one or more computer-processed or computer-processable items of data. A data object can, for example, comprise a simple data type such as a character, integer, float, or double, a structure comprising multiple simple data types or structures, more complex data types such as images, or a suitable combination thereof. A "document," as used herein, may include content or a collection of content in any machine-readable or machine-processable format, such as Joint Photographic Experts Group (JPEG) format or Portable Document Format (PDF), including textual or image-based PDF documents. A document may include a plurality of data objects, such as text data objects, image data objects, or both. Data objects in a document may be structured into one or multiple pages, and within structures such as tables or charts. Example documents include debit notes, credit notes, invoices, purchase orders, payment advice, business cards, word processing files, passports, identity cards, birth certificates, emails, academic papers, articles, court cases, books, and so on.

A "feature," as used herein in the context of a document upon which processing is performed, refers to any attribute or part of a data object that has one or more values associated with it. A feature may have a value that forms part of, or is contained in, another data object, and that can be extracted, inferred, or otherwise obtained from the other data object using a computer process. By way of example, a document such as an invoice might include values for a number of features, such as a value for an "invoice number" feature and a value for an "invoice date" feature. In some examples, such values are obtained from a document by a computer process.

Documents can have varying formats, types, and structures. Many documents are lengthy or contain complex content. It can thus be technically challenging to classify documents in an efficient and accurate manner via an automated system. In this context, the "class" of a document is, for example, a document type, a document category, or a generic name for the document.

Furthermore, a user may have a need for an automated system suitable for classifying multiple documents and extracting values from the documents, obviating the need for a human to, for example, read each document, determine its class and relevant values, and enter the class and relevant values into a computer system. Challenges may arise in efficiently performing document classification and extraction of values from documents in a streamlined process.

For example, a user might have access to a tool that leverages a trained machine learning model or other computational model for data extraction. As used herein, an "extraction model" may include a computational model that is specifically designed or configured to identify and extract one or more particular data objects from documents. An extraction model can be trained on training data that includes documents annotated with the correct extractions for one or more various fields. Extraction models can be based on various machine learning techniques, including Convolutional Neural Networks (CNNs) or other suitable algorithms, that enable the recognition of patterns, features, or text.

While an extraction model can be a useful tool for extracting one or more data objects and thus obviating the need for the user to manually search through the document to find the data objects, it does not classify the document. For example, if the user is processing documents that can each be either a credit note or a debit note, and an extraction model is trained to extract "net amount" from the document, the user can obtain the "net amount" automatically but still has to classify the document based on the output (e.g., if the "net amount" is positive, it is a debit note, and if the "net amount" is negative, it is a credit note) and enter the findings into a computer system. This can be time-consuming and inefficient.

In some cases, the extraction model is linked to a particular document type, and the user might need to classify the document before extraction can even commence (e.g., the features to be extracted are determined by the document type). In other words, in some cases, the user needs to analyze and classify the document manually in order to know which extraction model to select for further processing. For example, the user reviews a contract document to determine its classification (e.g., antenuptial contract, a contract of sale, a loan contract, or rental contract) and then selects an extraction model (or models) to be used to perform extraction on the document based on its classification. These and other inefficiencies may lead to a bottleneck at initial stages of document processing, making the overall process tedious, error-prone, or time-consuming, particularly in workflows that handle a range of different document types, structures, or formats.

Examples described herein leverage generative artificial intelligence (AI) to perform document classification. In some examples, business-related documents such as invoices, contracts, reports, or service tickets are automatically classified by a document processing service to enhance efficiency, accuracy, and automation in a document management process. Examples described herein further leverage extraction models, or a combination of generative AI and extraction models, to perform data extraction.

An example method may include receiving, via a user interface presented at a user device (e.g., a web interface of a web application), first user input and second user input. The first user input includes a document and the second user input identifies a classification schema. The classification schema is retrieved based on the identification thereof in the second user input to obtain first prompt content. The first prompt content may include parts of the classification schema that are to be provided to a generative machine learning model (e.g., an LLM).

In some examples, the method includes generating prompt data (e.g., one or more text prompts) that includes the first prompt content as well as second prompt content. The second prompt content includes a document classification instruction. The prompt data is caused to be processed, together with document content of the document, by the generative machine learning model, to obtain a classification result for the document. The classification result is presented via the user interface.

In some examples, the document content is obtained from the document via a preprocessing operation and passed to the generative machine learning model. For example, where the document is in PDF or JPEG format, a system as described herein can perform preprocessing of the document to obtain, from the document, the document content in text format to efficiently add the document content to other prompt data for downstream processing by the generative machine learning model.

The classification schema defines metadata or possible metadata associated with the document to be classified. Users may define custom classification schemas. In some examples, the classification schema comprises a set of classes, and the document classification instruction comprises an instruction to analyze or process the document content and select the classification result from the set of classes, thereby to obtain a classification result that accurately classifies the document.

In some examples, the generative machine learning model is fine-tuned for use with respect to the classification schema. The generative machine learning model may be fine-tuned using training data that identifies, for each of a plurality of sets of training data items, a class from among the set of classes. Once fine-tuned, the generative machine learning model may be associated with the relevant classification task by adding or associating an identifier there of, referred to herein as a model deployment identifier, with the classification schema. By fine-tuning the generative machine learning model on classification-specific training data, internal variables of the generative machine learning model are adjusted so that the accuracy of its classifications is improved and the error rate is minimized.

In some examples, the classification schema identifies one or more features, and the document classification instruction comprises an instruction to use one or more data objects associated with the one or more features in the document content to generate the classification result. For example, the classification schema identifies one or more fields of interest in the document that are to be analyzed to determine a class of the document. The training data that is used to fine-tune the generative machine learning model may identify such features or data objects (e.g., values) associated with the features.

The method may include performing automated data extraction in addition to document classification, In some examples, the method includes identifying one or more features in the document and extracting, by one or more extraction models and based on a data extraction schema associated with the document, one or more data objects (e.g., values) associated with the one or more features from the document. The extracted data objects may be presented via the user interface.

The data extraction schema defines metadata associated with the document that is the target of extraction. Users may define custom data extraction schemas that define features to be extracted. In some examples, the data extraction schema defines one or more extraction models to be used for extraction. A custom data extraction schema may link a plurality of features to respective extraction models.

In some examples, each feature in the data extraction schema is associated with an extraction model. Each extraction model may be referred to as feature-specific because the extraction model is, in some examples, specifically, or even exclusively, trained for extraction associated with the feature to be associated with that extraction model. In some examples, an extraction model is trained to extract a particular feature using dedicated training data for that particular feature. This may include annotated training data to facilitate training of the extraction model to identify and extract (or predict) a value of the particular feature. By processing feature-specific training data, internal variables of the extraction model are adjusted so that the accuracy of its predictions related to the feature of interest is improved and the error rate of the extraction model is minimized.

Once trained, an extraction model may be associated with the relevant feature by mapping a model deployment identifier of the extraction model to the relevant feature in the data extraction schema. A feature in a data extraction schema is, in some examples, linked to an extraction model that is not necessarily a machine learning model (e.g., a rules-based model).

In some examples, a specific data extraction schema is selected based on the classification result. For example, the data extraction schema includes a document type or document name that corresponds to the classification result. The method may include selecting, based on the classification result, the data extraction schema from among a plurality of data extraction schemas. In this way, automated classification is efficiently linked to downstream automated extraction.

Extraction model-driven data extraction may be combined with generative AI-driven data extraction to improve accuracy or efficiency. In some examples, a user reviews one or more data objects extracted via one or more extraction models, and provides user input indicative of rejection or querying the accuracy of at least a first data object extracted by an extraction model. In response to receiving the user input, the system causes processing, by the generative machine learning model (e.g., the LLM), of a feature extraction instruction together with the document content to extract a data object (e.g., to retry extraction of the first data object).

In some examples, in addition to the first prompt content and the second prompt content, the prompt data further includes third prompt content that includes the feature extraction instruction, and the processing by the generative machine learning model further comprises extracting, based on the third prompt content, one or more data objects associated with one or more features in the document. The one or more extracted data objects may be presented via the user interface.

Examples disclosed herein provide for a flexible and customizable, yet accurate and efficient, document processing service. The document processing service can be deployed to streamline document management processes, automate classification or data extraction, support compliance, and improve electronic records and indexing of data.

The integration of a generative machine learning model, such as an LLM, into a document processing service, can improve performance and efficiency, particularly when it comes to classifying a wide variety of document types. For example, an LLM may perform well in classifying, based on a user's classification schema, documents that deviate from expected formats or contain complex, nuanced information (e.g., when the LLM has been fine-tuned as described herein).

Examples described herein can reduce misclassifications, as well as manual review or interventions needed to correct errors, thereby alleviating technical challenges and improving overall system throughput. By leveraging advanced natural language processing capabilities together with custom classification schemas, an LLM analyzes semantic and contextual elements of documents, enabling it to classify them with higher accuracy and flexibility than at least some other techniques.

In the context of the present disclosure, while an LLM or other similar generative machine learning model can perform extraction tasks, such as identifying relevant values in a document and returning them, an LLM differs from an extraction model. An extraction model is specifically designed and configured to identify and extract one or more particular data objects from documents, focusing on recognizing patterns or features within the document content. In contrast, an LLM or other similar generative machine learning model can be used for broader tasks such as generating, understanding, and processing human language, possibly in addition to more targeted tasks such as classifying documents and identifying or extracting specific data objects.

Examples described herein enhance scalability and flexibility in processing diverse document types by incorporating a schema component that allows users to define and modify classification processes easily. This component supports the creation of custom schemas that can be adapted quickly to new document types or structures without extensive system reconfiguration.

Technical challenges may arise in accurately extracting relevant data from documents, particularly when dealing with documents that have inconsistent or non-standard layouts. Subject matter in the present disclosure addresses technical problems associated with inadequate data extraction accuracy through the implementation of a data extraction schema. In some examples, a streamlined and automated workflow combines document classification and data extraction. Accuracy or efficiency can be improved by leveraging both extraction models and generative AI-driven extraction. In some examples, generative AI-driven extraction can automatically be applied to supplement or improve extraction model-based extraction that was initially performed.

In this way, a document processing service can provide more reliable outputs and save at least some computing resources that would otherwise be required to redo classifications or extractions, or correct erroneous outputs. Examples of such computing resources may include processor cycles, network traffic, memory usage, graphics processing unit (GPU) resources, data storage capacity, power consumption, and cooling capacity. Furthermore, systems that are trained or fine-tuned according to examples described herein may perform better (e.g., be more accurate and/or require less human intervention) than systems relying on generic models.

Examples described in the present disclosure provide a practical application that significantly enhances the functioning of computer systems involved in document processing tasks. For example, by integrating a generative machine learning model trained on a diverse dataset into a document processing service accessed by a user (e.g., via a web application), the system not only improves in speed and efficiency but also in the quality of document classification or data extraction. This can allow an enterprise to handle larger volumes of documents in shorter periods, thus saving time and resources. In some examples, by linking classification and data extraction in a streamlined process, further time and resources can be saved. The adaptability of the system to new or changing document classes or formats through user-defined schemas further enhances its functionality.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 114 (e.g., a browser) or a programmatic client 110 (e.g., an "app") may be hosted and executed on the user device 106.

An Application Program Interface (API) server 130 and a web server 132 provide respective programmatic and web interfaces to components of the server system 104. An application server 128 hosts a document processing service system 134, which includes components, modules, or applications. It is noted that, in some examples, the document processing service system 134 is hosted across multiple application servers.

The user device 106 can communicate with the application server 128, for example, via the web interface supported by the web server 132 or via the programmatic interface provided by the API server 130. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 114 or programmatic client 110) or the server system 104, the location of certain functionality either within the user device 106 or the server system 104 may be a design choice.

The application server 128 is communicatively coupled to database servers 136, facilitating access to one or more information storage repository, such as a database 138. In some examples, the database 138 includes storage devices that store information to be processed by the document processing service system 134 or one or more models described herein, such as documents, prompts, instructions, classification schemas, or data extraction schemas.

The application server 128 accesses application data (e.g., application data stored by the database servers 136) to provide one or more applications or software tools to the user device 106 via a web interface 116 or an app interface 112. As described further below according to examples, the application server 128, using the document processing service system 134, may provide one or more tools or functions for document classification.

Furthermore, the document processing service system 134 may provide one or more tools or functions for data extraction (e.g., automated extraction of values from documents).

For example, the user 108 uploads a document (or selects a stored document from the database 138) via the web interface 116, and selects a classification schema. The document processing service system 134 then uses the classification schema to classify the document. In some examples, the document processing service system 134 enables the user 108 to create custom classification schemas, and utilizes generative AI to perform classification. The document processing service system 134 may operate together with an AI and machine learning system 140 to provide an efficient tool for classifying multiple documents.

From an extraction perspective, the user 108 may wish to extract values related to one or multiple fields from each of a plurality of documents. Using an invoice as an example business document, the structure and format of invoices can vary widely across different businesses, industries and regions, and the set of invoices of the user 108 may have a unique structure and/or include non-standard fields (such as header fields or line item fields), making a generic extraction system, such as one using optical character recognition (OCR) and a pre-trained extraction model, unsatisfactory. As another example, the user 108 may have a unique set of business documents for which no "template" extractor tool exists, or which has at least one feature (e.g., field) for which there is no machine learning extraction model available.

The document processing service system 134 according to examples in this disclosure allows the user 108 to create a bespoke data extraction schema and to train and/or allocate specialized models to extract values for specific fields, line items, table entries, or the like, based on the data extraction schema. The document processing service system 134 may operate together with an AI and machine learning system 140 to provide an efficient tool for data extraction.

To access the document processing service system 134, the user 108 may create an account with an entity associated with the server system 104, such as a service provider (or access an existing account with the entity). The user 108 may use account credentials to access the web interface 116 (via a suitable web browser) and request access to a document processing service. The document processing service system 134 may automatically create a service instance associated with a document processing application at the application server 128 which can be accessed by the user device 106 via one or more service APIs to utilize functionality described herein. The user 108 may also, in some examples, access the document processing application using a dedicated programmatic client 110, in which case some functionality may be provided client-side and other functionality may be provided server-side.

To effectively manage and process a diverse array of documents, the document processing service system 134 is equipped to handle various document types and structures. In some examples, this capability ensures that the document processing service system 134 can accommodate documents regardless of their specific format or the industry standards they adhere to. Moreover, the document processing service system 134 may support different layouts and structures for specific fields within the documents. For example, an invoice might display its total amount and tax details in various formats depending on the business or regional standards. The document processing service system 134 is configured to recognize and process, or facilitate the recognition and processing of, these variations for accurate document handling. In some examples, the document processing service system 134 allows the user 108 to select the most appropriate data extraction or classification model based on specific characteristics of the document they intend to have processed via the document processing service system 134.

The document processing service system 134 may provide a user interface (e.g., the web interface 116 or the app interface 112) to allow the user 108 to create schemas, upload documents, select schemas to apply to document processing instructions, and view results. The user interface may also enable the user 108 to refine or retry classification or extraction after an initial classification or extraction (e.g., to retry an extraction operation using a different model), thereby enabling dynamic adjustment of a classification or extraction strategy.

One or more of the application server 128, the database servers 136, the API server 130, the web server 132, the document processing service system 134, and the AI and machine learning system 140 may each be implemented in a computer system, in whole or in part, as described below with respect to FIG. 10. In some examples, external applications, such as an external application 120 executing on an external server 118, can communicate with the application server 128 via the programmatic interface provided by the API server 130. For example, a third-party application may support one or more features or functions on a website or platform hosted by a third party, or may perform certain methodologies and provide input or output information to the application server 128 for further processing or publication.

As an example, the document processing service system 134 and the AI and machine learning system 140 can be linked to an external server 122 that provides a processing engine 124 and an LLM 126. The AI and machine learning system 140 may communicate with the external server 122 to send instructions to and receive outputs from the LLM 126.

In some examples, the AI and machine learning system 140 provides machine learning pipelines and models. The AI and machine learning system 140 may provide various capabilities, such as training of models, deployment of trained models, facilitating inference, and monitoring of performance. In some examples, and as is further described below, the document processing service system 134 communicates with the AI and machine learning system 140 to provide machine learning-related features and functionalities.

The AI and machine learning system 140 may provide automated machine learning capabilities that can generate pipelines tailored to a given process. The AI and machine learning system 140 may evaluate metadata and attributes to determine aspects such as the appropriate data preprocessing, feature engineering, model algorithms, and hyperparameters to use. In some examples, the AI and machine learning system 140 provides access to both extraction models (e.g., CNNs trained for feature extraction) and one or more generative machine learning models (e.g., LLMs).

In some examples, the AI and machine learning system 140 provides access to a generative machine learning model, such as an LLM (e.g., the LLM 126 or an internally hosted LLM). An LLM may include a computational model developed for the tasks of processing, generating, and understanding human language (and other inputs, such as values, structured data, or code). It employs machine learning methodologies, including deep learning architectures. The training of an LLM may utilize comprehensive training data, such as vast data sets of textual content, to enable the LLM to recognize patterns in language or other text. The LLM may be built upon a neural network framework, such as the transformer architecture (e.g., a transformer-based LLM). The LLM may contain a significant number of parameters (e.g., in excess of a billion) that are adjusted during training to optimize performance.

Referring to the LLM 126, the LLM 126 may be accessible via the processing engine 124. The processing engine 124 is a component running on the external server 122 that is communicatively coupled to the LLM 126. The processing engine 124 may handle certain preprocessing of data before sending it to the LLM 126 and certain postprocessing of the responses received from the LLM 126. For preprocessing, the processing engine 124 may tokenize, compress, or format the data to optimize it for the LLM 126. For postprocessing, it may format the LLM's response, perform detokenization or decompression, and prepare the response for sending back to the requesting system (e.g., the document processing service system 134).

An LLM may provide natural language processing capabilities that enable it to respond to various queries. Specifically, in some examples, the LLM may process a prompt provided by the document processing service system 134 in the context of a provided document, and automatically classify the document. Further, in some examples, the LLM may process a prompt in the context of a provided document and automatically identify and output features of interest (and thus essentially extract those features). In some examples, the LLM has been fine-tuned on tasks relating to specific documents to enhance its ability to provide useful results. For example, the LLM may be fine-tuned to focus specifically on requests to classify a business document into one of a set number of classes or categories.

The document processing service system 134 may thus integrate with an LLM to leverage capabilities of the LLM. While the LLM is used as an example of a machine learning model in this disclosure, it is noted that other types of generative machine learning models may also be used for classification.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
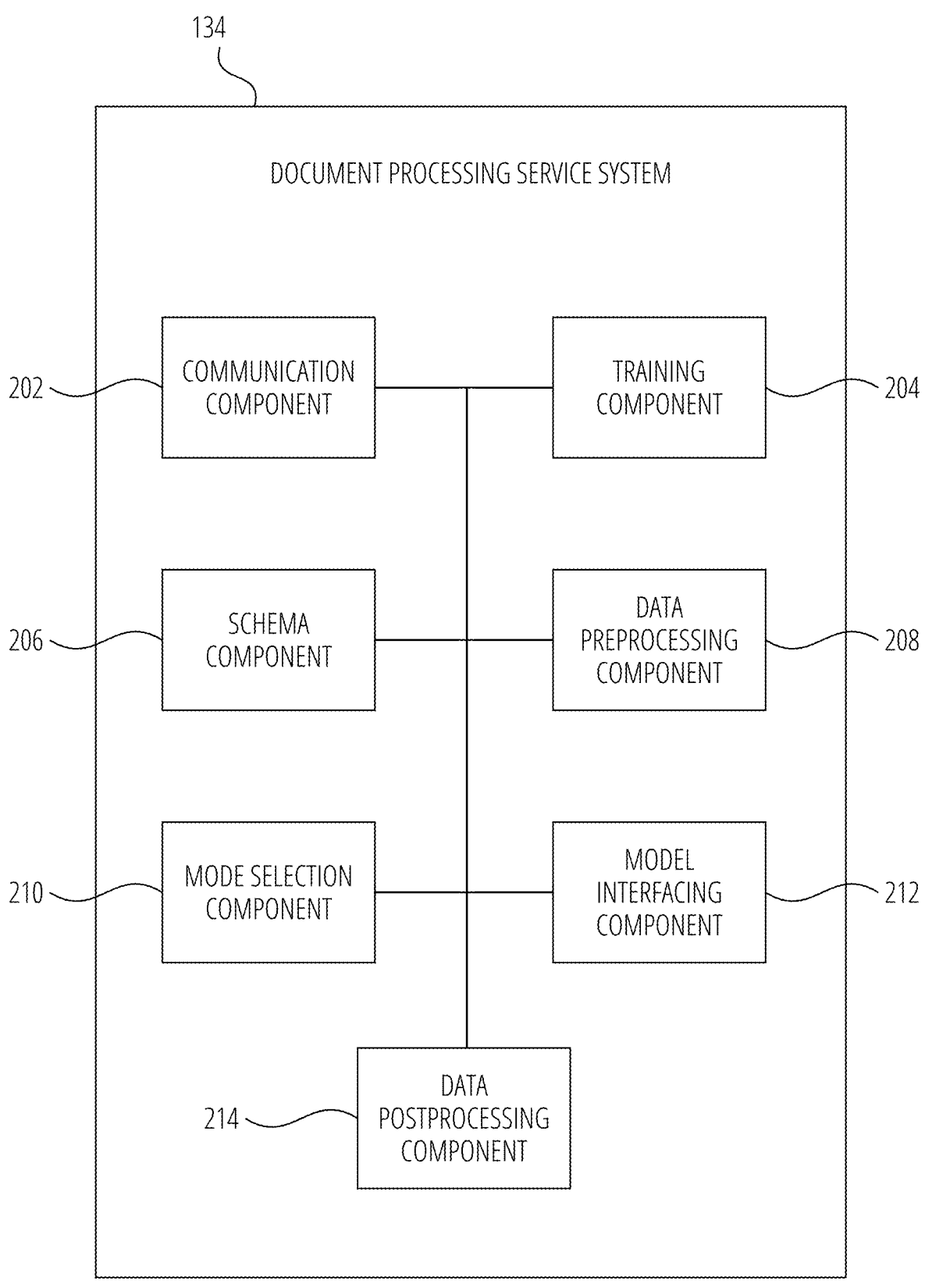
FIG. 2 is a block diagram of components of a document processing service system, according to some examples.

FIG. 2 illustrates components of the document processing service system 134 of FIG. 1, according to some examples. The document processing service system 134 is shown to include a communication component 202, a training component 204, a schema component 206, a data preprocessing component 208, a mode selection component 210, a model interfacing component 212, and a data postprocessing component 214.

In some examples, at least some of the components shown in FIG. 2 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components. Furthermore, according to various examples, components described herein may be implemented using a single machine, database, or device, or be distributed across multiple machines, databases, or devices.

The document processing service system 134 may work with the AI and machine learning system 140 of FIG. 1 to provide certain features or functionalities. Accordingly, where AI-related components or functionalities are described herein with reference to a component of FIG. 2, it will be appreciated that such components or functionalities may be provided by the document processing service system 134, the AI and machine learning system 140, or a combination of the document processing service system 134 and the AI and machine learning system 140.

Figure 6:
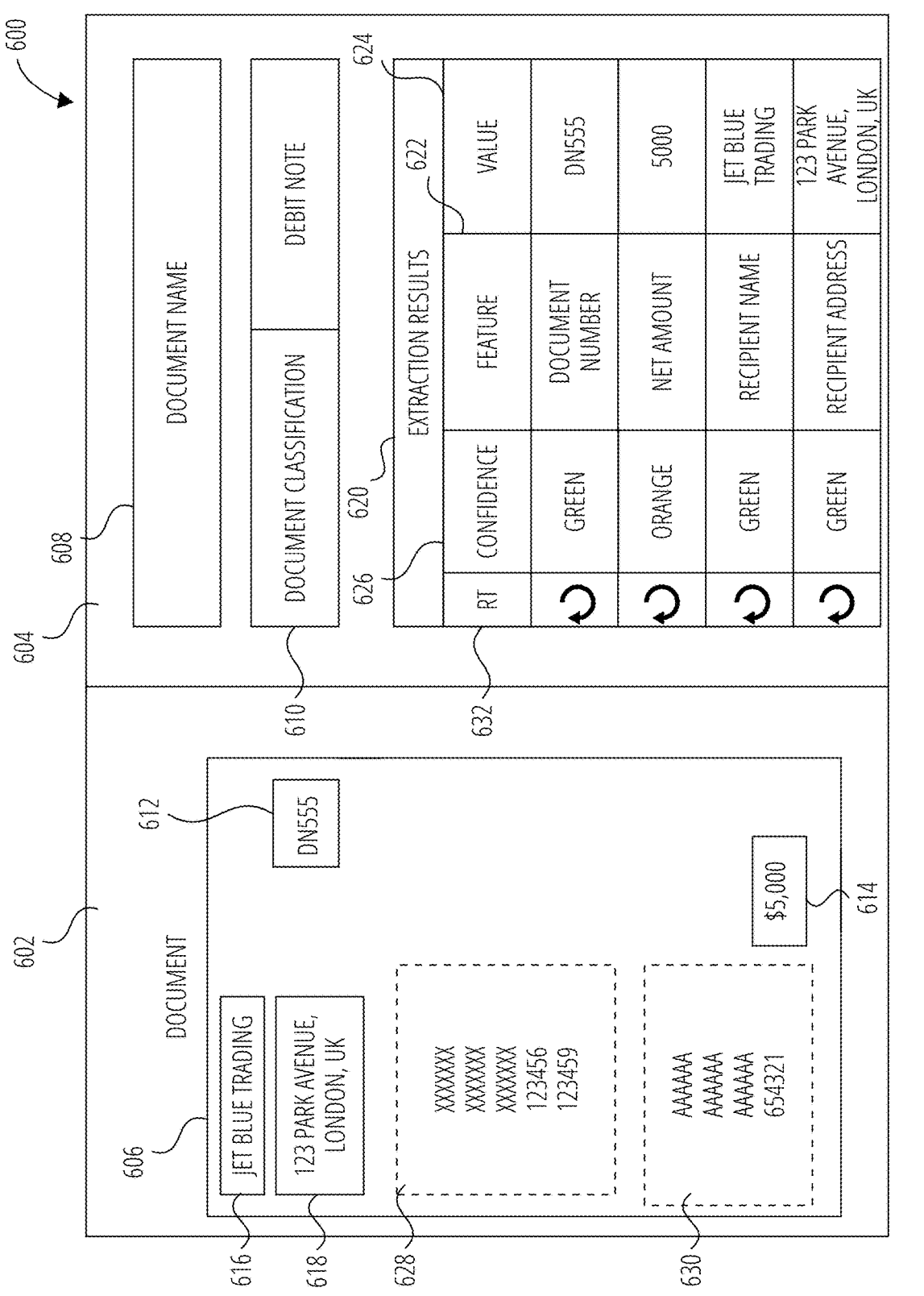
FIG. 6 is a user interface diagram illustrating a user interface that presents document classification and data extraction results, according to some examples.

Referring specifically to FIG. 2, the communication component 202 receives data sent to the document processing service system 134 and transmits data from the document processing service system 134. For example, the communication component 202 receives, from the user device 106, classification instructions or extraction instructions and transmits, to the user device 106, results of classification operations or extraction operations. The communication component 202 may provide a graphical user interface for the user 108 to submit requests, or for the user to review, validate, adjust, or override results. A user interface according to some examples is shown in FIG. 6 and described below.

In some examples, the communication component 202 receives schema information, training data for machine learning model training and/or input documents for data extraction. For example, the user 108 can provide input to create or modify a schema. Input documents in the form of, for example, digitized business documents (such as invoices, payment advice documents, or the like), may be uploaded by the user 108 of FIG. 1 to the document processing service system 134 for classification or extraction of feature values. In some examples, the document processing service system 134 is configured to receive requests and other data via API calls and return responses and results via the communication component 202 (e.g., comprising data objects in the JavaScript Object Notation (JSON) data interchange format).

In some examples, the training component 204 is responsible for at least some aspects of preparing, curating, or managing training data used to train one or more machine learning models. Training may involve training a new model "from scratch" or fine-tuning a pre-trained model. For example, the user 108 provides a diverse and representative set of business documents and annotates them with classification or feature-identification information (depending on the goal of the training). The training component 204 can then trigger or facilitate training or fine-tuning of one or more models based on such training data.

The training component 204 may perform or facilitate certain training processes, such as supervised learning involving receiving training data comprising a plurality of sample documents with annotations linked to a given class or feature, and causing a machine learning model to be trained on the training data. In some examples, the training component 204 manages the fine-tuning of a pre-trained LLM to improve its ability to perform one or both of document classification or feature extraction. In some examples, the training component 204 manages the training of new extraction models that are used for extracting values of specific features from uploaded documents.

The schema component 206 is responsible for generating and managing customizable schemas. The schemas include classification schemas and, in some examples, data extraction schemas. A schema may be created in any suitable format, depending, for example, on the network implementation (e.g., JSON format).

The schema component 206 may, for example, receive user input regarding data to be included in a classification schema. The classification schema is then stored in the database 138. For example, a classification schema can specify one or more of:

Schema name;
Schema description;
Document classes;
Classification fields (e.g., where a model performs classification based on particular fields); or
Machine learning model identifier (e.g., a model deployment identifier of an LLM to be used for classification).

In some examples, a specific generative machine learning model is linked to the classification schema. For example, where the user 108 has access to a particular LLM (e.g., a fine-tuned LLM), a model deployment identifier of the LLM can be included in the classification schema.

The schema component 206 may receive user input regarding data to be included in a data extraction schema. This may include features, data types of features, and details of extraction models to associate with each feature or with multiple features (e.g., model deployment identifiers to associate each feature with an extraction model). In some examples, each feature may be associated with a corresponding extraction model by the schema component 206. The data extraction schema is stored in the database 138. For example, a classification schema can specify one or more of:

Schema name;
Schema description;
Document type (e.g., class);
Features to extract (e.g., header and/or line-item fields) along with their data types and descriptions;
One or more extraction model identifiers; or
Mappings between features and extraction models.

Systems according to examples described herein may provide a user with enhanced flexibility by allowing for granular customization of schemas, including classification schemas or data extraction schemas. From a data extraction schema perspective, assignment of extraction models to specific features within a custom data extraction schema can improve reliability or accuracy. In some examples, efficiencies may be improved by adopting a hybrid allocation methodology, such as by assigning an existing, trained machine learning model to a first feature of a document that can be accurately predicted with the existing model, and training a bespoke, new machine learning model that can be assigned to a second feature, where the second feature is relatively peculiar and/or otherwise not obtainable in a reliable manner.

The data preprocessing component 208 is configured to prepare, transform, adjust, or otherwise process incoming documents for further processing by the document processing service system 134 or another component. For example, the data preprocessing component 208 can extract document content (e.g., text) from a document and pass the document content on to a machine learning model for processing. The data preprocessing component 208 can perform normalization, noise reduction, or preliminary feature extraction to enhance the quality and consistency of the data fed into the machine learning models. For instance, the data preprocessing component 208 might convert scanned images of documents into a uniform digital format or extract text using optical character recognition (OCR).

In some examples, the mode selection component 210 is configured to determine an operational mode of the document processing service system 134, adjust the operational mode, and instruct other components of the document processing service system 134 to operate according to the operational mode. For example, the mode selection component 210 determines, based on user input or system settings, that only document classification is to be performed and that it is to be performed using a particular workflow. In some examples, the mode selection component 210 uses a classification schema selected by the user 108 to instruct other components of the document processing service system 134 with respect to classification operations.

In another example, the mode selection component 210 determines, based on user input or system settings, that both document classification and data extraction is to be performed, and the workflow or sequence to follow. The mode selection component 210 transmits instructions to other components of the document processing service system 134 to proceed according to the current operational mode. In this regard, the mode selection component 210 may utilize the classification schema selected by the user 108 and, where relevant, a data extraction schema selected by the user 108 or otherwise identified by the mode selection component 210.

The mode selection component 210 may be configured to dynamically switch between operational modes to balance or prioritize certain requirements. For example, where accuracy is prioritized, the mode selection component 210 may designate an operational mode in which both an LLM and an extraction model is used for extracting the same feature. On the other hand, where speed or cost is prioritized, the mode selection component 210 may designate an operational mode in which the LLM is only used for classification of the document, and the extraction model is used for extracting the feature. The mode selection component 210 may automatically react to user input to adjust the operational mode. For example, if the user 108 rejects a particular result that was generated using an extraction model, the mode selection component 210 automatically causes the same extraction operation to be performed by a generative machine learning model in an attempt to provide an improved or acceptable result.

The model interfacing component 212 serves as a bridge between the document processing service system 134 and machine learning models (and related components). The model interfacing component 212 may generate prompt data to be provided to a generative machine learning model (e.g., the LLM 126) and receive responses from the generative machine learning model.

For example, the model interfacing component 212 combines data from a classification schema with a document classification instruction into prompt data for the generative machine learning model. The document classification instruction may provide a task, a role, constraints, or additional context to the generative machine learning model. In some examples, the model interfacing component 212 is configured to generate prompts in a standardized structure and wording to promote consistent model outputs across different instructions.

Prompt data may be transmitted to a generative machine learning model as a single prompt. Alternatively, different portions of the prompt data may be provided separately. For example, the document classification instruction might be provided as a "pre-prompt" portion of the prompt data, included in the context window of the generative machine learning model (e.g., together with document content). Other data, such as classes obtained from a classification schema, may then be provided separately.

In some examples, the model interfacing component 212 transmits instructions to extraction models and obtains outputs or predictions from the extraction models. For example, the model interfacing component 212 identifies, in a data extraction schema, an extraction model that is to be used to extract a value for a particular feature from a document, and causes the document to be processed by the extraction model. The model interfacing component 212 may receive instructions from the mode selection component 210 based on a current operational mode.

In this way, the document processing service system 134 works with the AI and machine learning system 140 or other AI-assisted components to perform document classification, data extraction, or both document classification and data extraction.

In some examples, the data postprocessing component 214 postprocesses "raw" outputs from a machine learning model. For example, the model interfacing component 212 may transmit responses it receives from one or more models to the data postprocessing component 214. The data postprocessing component 214 validates model output by checking whether the output has an expected structure (e.g., JSON object structure) or contains an expected or allowed response (e.g., a permitted classification). The data postprocessing component 214 may be configured to resolve issues, such as missing data, and may format outputs into required data structures such that the communication component 202 can present outputs to the user 108 within a user interface in a suitable manner. The data postprocessing component 214 transmits final results (e.g., a classification result or an extracted data object) to the communication component 202.

FIG. 3 illustrates operations of a method 300 suitable for performing automated document classification, according to some examples. By way of example and not limitation, aspects of the method 300 may be performed by components, devices, systems, network, or databases shown in FIG. 1 and FIG. 2, and they may accordingly be referenced below.

The method 300 commences at opening loop operation 302 and proceeds to operation 304, where the user 108 is enabled to create classification schemas in the context of an application (e.g., a document processing service application, as an example of the web client 114) provided by the document processing service system 134. For example, the user 108 uses the user device 106 to access the application and creates a first classification schema for classifying documents as being either debit notes or credit notes, and a second classification schema for classifying documents as being one of a resume, a cover letter, or a candidate experience certificate. Tables 1 and 2 below illustrate examples of certain details of such a "note classification schema" and a "candidate documents classification schema," according to some examples.

TABLE 1

| Example of a note classification schema | |
| --- | --- |
| Schema Name | Note_Classification_Schema |
| Schema Description | Schema to classify document as debit note or credit note |
| Document Classes | Debit note; Credit note |
| Classification Fields | Net amount |

TABLE 2

| Example of a candidate documents classification schema | |
| --- | --- |
| Schema Name | Candidate_Documents_Classification_Schema |
| Schema Description | Schema to classify different documents used during an interview process for new employees process for new employees |
| Document Classes | Resume; Cover Letter; Experience Certificate |
| Classification Fields | — |

As shown in Tables 1 and 2, each classification schema indicates the relevant set of classes. In some examples, a classification schema also indicates features (e.g., fields or other attributes in the document) to be used to perform classification. For example, these features can include one or more features that identify a document as being of a particular document type. In the example of classifying a document as a debit note or a credit note, the net amount is used. Furthermore, in some examples, each classification schema is linked to a particular LLM (as an example of a generative machine learning model). The classification schemas are stored in the database 138 (e.g., by the schema component 206). It is noted that Tables 1 and 2 are merely examples, and that other examples may include significantly more classes and/or multiple classification fields.

At operation 306, the document processing service system 134 receives first user input (e.g., at the communication component 202) that includes a document. For example, the user 108 uploads a cover letter or selects a cover letter that is stored or identified in the database 138. At operation 308, the document processing service system 134 receives second user input that includes a selection of one of the classification schemas. For example, the user 108 selects the second classification schema described above.

In some examples, the document processing service system 134 causes presentation of a plurality of options in the user interface (e.g., the web interface 116), each corresponding to one of the classification schemas associated with a user account of the user 108. The second user input may then include a selection of one of the options that is made using the user device 106.

The document processing service system 134 retrieves the selected classification schema to obtain first prompt content at operation 310. The document processing service system 134 might, for example, retrieve the set of classes of the second classification schema. In some examples, the document processing service system 134 also retrieves, from the classification schema, a description of the schema and/or features to be used in classifying the document. In some examples, the entire classification schema is retrieved and used as the first prompt content.

At operation 312, the document processing service system 134 dynamically generates prompt data to provide to the LLM. For example, the model interfacing component 212 combines the first prompt content with second prompt content that includes a predetermined document classification instruction. Two examples of prompts are shown below.

First Prompt Example

Given the following document <document_content>, classify the document into one of these classes—<Document Classes from Schema>. Use the fields <Classification Fields from schema> to assist in making this decision.

Second Prompt Example

Given the following document <document_content>, classify the document into one of these classes—<Document Classes from Schema> based on the information available in the document.

The prompt data may also include further contextual or instructing information, such as a more detailed indication of the specific role of the LLM and instructions with respect to a format of the response (e.g., the response should only include the "Document Class" and no other text). The method 300 proceeds to operation 314, where the document processing service system 134 causes processing of the prompt data and the document content by the LLM to obtain a classification result. For example, the LLM processes the text content of the cover letter together with the prompt data, and outputs "Cover Letter" in accordance with the set of classes in the classification schema.

As mentioned, the LLM may be hosted internally or externally. In some examples, the prompt data and document content are transmitted to the external server 122 by the model interfacing component 212 for processing by the LLM 126. In some examples, the LLM 126 or the processing engine 124 encodes a set of input items into a vector representation, or encodes respective input items into separate vector representations, and then the LLM 126 processes the vector representation or representations to provide a response that addresses the relevant request. An output vector may be decoded into natural language text by the LLM 126 or the processing engine 124 and provided as the response (e.g., the classification result).

The model interfacing component 212 obtains the classification result (e.g., "Cover Letter") from the LLM. As mentioned, the data postprocessing component 214 may perform certain processing steps (e.g., validation), after which the communication component 202 causes presentation of the classification result at the user device 106 of the user 108 (e.g., in the web interface 116) at operation 316. The method 300 concludes at closing loop operation 318.

Figure 4:
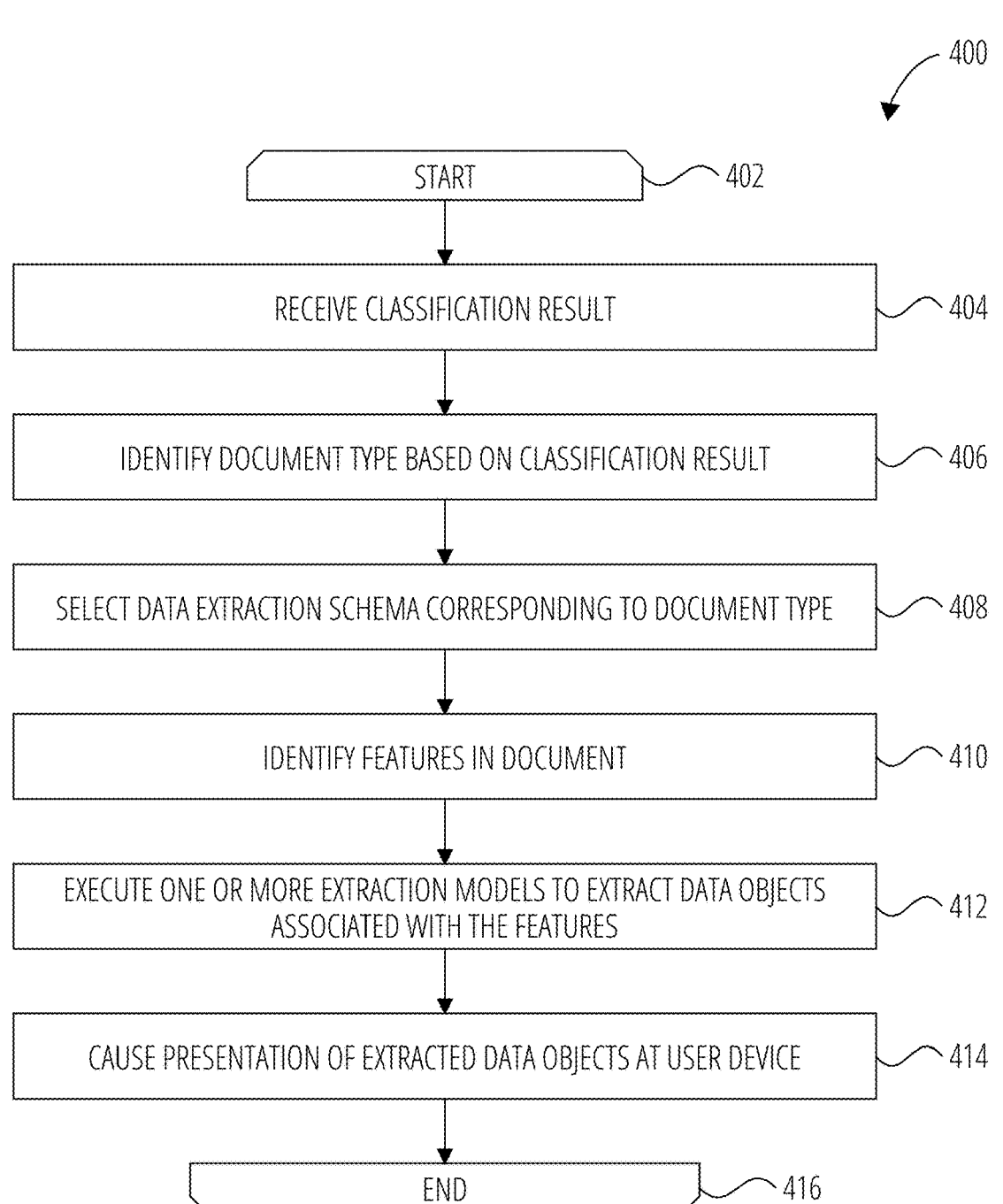
FIG. 4 is a flowchart illustrating operations of a method suitable for performing automated data extraction based on a result of an automated document classification process, according to some examples.

FIG. 4 illustrates operations of a method 400 suitable for performing automated data extraction based on a result of an automated document classification process, according to some examples. By way of example and not limitation, aspects of the method 400 may be performed by components, devices, systems, network, or databases shown in FIG. 1 and FIG. 2, and they may accordingly be referenced below.

The method 400 commences at opening loop operation 402 and proceeds to operation 404, where the document processing service system 134 receives or accesses a classification result. For example, a method such as the method 300 of FIG. 3 is performed to automatically classify a document, and the classification result is accessed by the document processing service system 134.

At operation 406, the document processing service system 134 uses the classification result to identify a document type of the document. For example, the document was classified, during the automated document classification process, as a "Debit Note." The document processing service system 134 then uses this information to trigger automated data extraction.

The document processing service system 134 locates and selects (e.g., from the database 138), at operation 408, a data extraction schema that is associated with the user account of the user 108 and that matches the classification result. For example, the document processing service system 134 identifies a data extraction schema for the "Debit Note" document type after receiving a corresponding classification result. Table 3 below illustrates an example of such a data extraction schema.

In some examples, the document processing service system 134 transmits a request to the user 108 to confirm or change the selection of the data extraction schema. In other examples, the document processing service system 134 automatically proceeds with data extraction once the classification result has been obtained.

Using the example of Table 3, the document processing service system 134 uses the data extraction schema to extract values for a number of features from the document (four different header field values and four different line item values). It will be appreciated that this is merely an example and that other document types, features, and/or any suitable number of features may be specified.

TABLE 3

| Example of a data extraction schema | |
| --- | --- |
| Schema Name | Debit_Note_Schema |
| Schema Description | Schema to extract fields from a debit note |
| Document Type | Debit Note (or Custom) |
| Header Fields | Document Number; Net Amount; Recipient Name; Recipient Address; |
| Line Item Fields | Item Description; Quantity; Unit Price; Amount |
| Model Deployment Identifier(s) | 1A5B7HH9C |

The document processing service system 134 identifies the features present in the data extraction schema (at operation 410). Alternatively, or additionally, the document processing service system 134 identifies one or more extraction models to be applied. The document processing service system 134 then initiates data extraction at operation 412. Specifically, the document processing service system 134 causes one or more extraction models to be executed to extract data objects (e.g., values) associated with the relevant features. As discussed, the model interfacing component 212 may be configured to send the document to the AI and machine learning system 140 to cause execution of the relevant model or models.

In the data extraction schema of Table 3, only one extraction model is identified, meaning that the same extrac-tion model is used to obtain all data objects defined by the features in the data extraction schema. In other examples, different extraction models can be mapped to different features. For example, a first extraction model is trained to extract "Net Amount" while a second extraction model is trained to extract "Document Number." Accordingly, in some examples, the user 108 can use the document process-ing service system 134 to customize the data extraction schema by linking different features to different extraction models.

In some examples, a data extraction schema does not contain a specific model identifier. For example, where no extraction model has been specifically trained to extract data from a particular document type, the document processing service system 134 automatically uses a generic model or a generative machine learning model (e.g., LLM) for extrac-tion.

Still referring to the method 400 of FIG. 4, the one or more extraction models then return the data objects as extracted (e.g., predicted using machine learning techniques, such as execution of CNNs) from the document. The model interfacing component 212 obtains the results. As men-tioned, the data postprocessing component 214 may perform certain processing steps (e.g., validation), after which the communication component 202 causes presentation of the results at the user device 106 of the user 108 (e.g., in the web interface 116) at operation 414.

The method 400 concludes at closing loop operation 416. When considering the examples of FIG. 3 and FIG. 4 holistically, it is noted that examples described herein pro-vide a streamlined process that automatically links auto-mated document classification and data extraction based on user-defined classification schemas and data extraction sche-mas.

Figure 5:
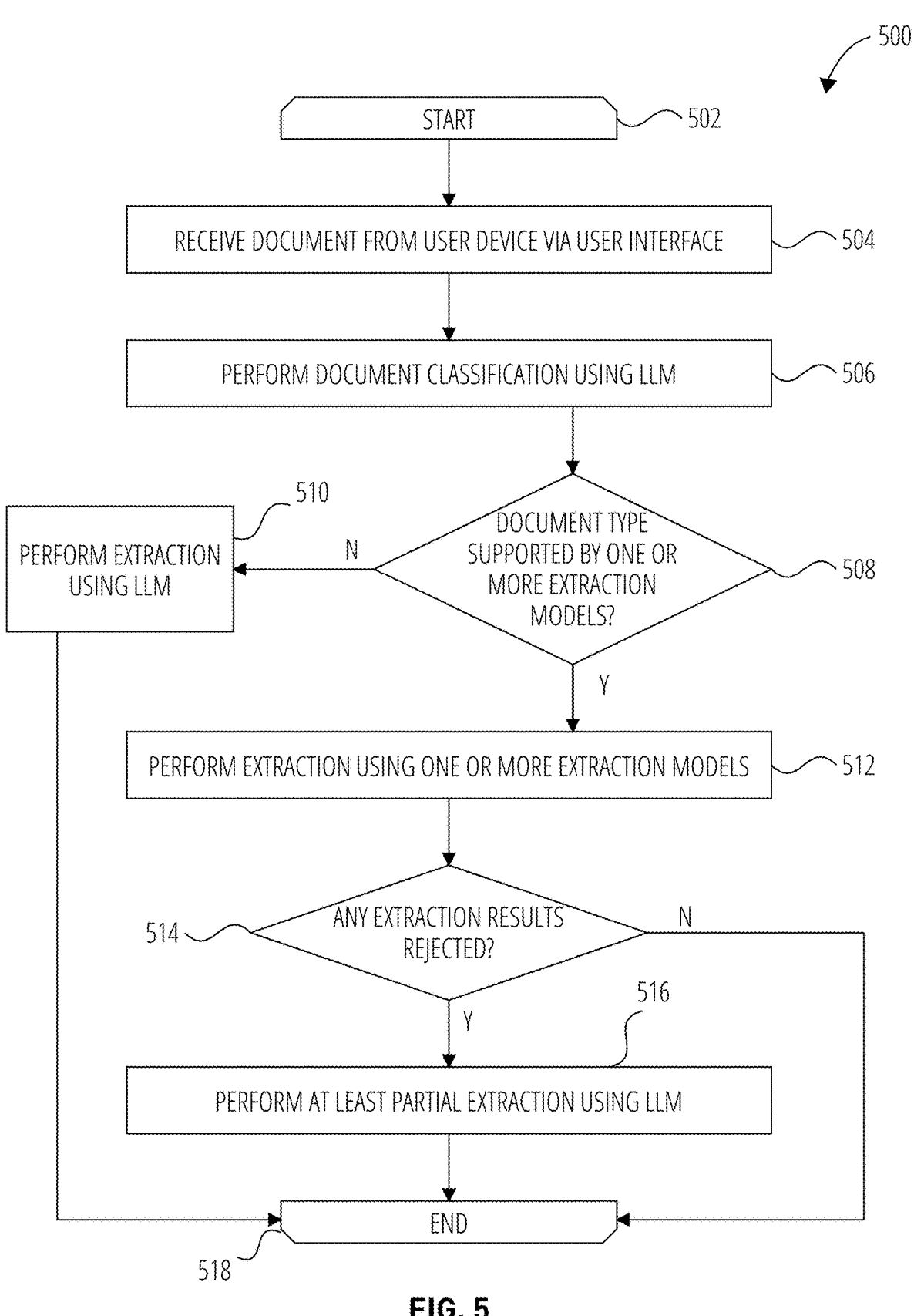
FIG. 5 is a flowchart illustrating operations of a method suitable for performing automated document classification and data extraction, utilizing both a Large Language Model (LLM) and one or more extraction models, according to some examples.

FIG. 5 illustrates operations of a method 500 suitable for performing automated document classification and data extraction, utilizing both an LLM (as an example of a generative machine learning model) and one or more extrac-tion models, according to some examples. By way of example and not limitation, aspects of the method 500 may be performed by components, devices, systems, network, or databases shown in FIG. 1 and FIG. 2, and they may accordingly be referenced below.

The method 500 commences at opening loop operation 502 and proceeds to operation 504, where the document processing service system 134 receives a document from the user device 106 of the user 108. For example, the user 108 uses the user device 106 to access an application (e.g., the web client 114) of the document processing service system 134 and uploads the document. In some examples, the user 108 also selects a suitable classification schema and submits a classification instruction.

The document processing service system 134 then causes document classification to be performed by the LLM at operation 506. For example, a method such as the method 300 of FIG. 3 is performed to automatically classify the document, and the classification result is accessed by the document processing service system 134.

The document processing service system 134 then ana-lyzes the document type (e.g., the class as indicated by the classification result) and determines whether the document type is supported by one or more extraction models (decision operation 508). For example, the document processing service system 134 checks for a suitable data extraction schema that matches the document type and that identifies one or more extraction models.

If, at decision operation 508, the document processing service system 134 determines that no suitable extraction models exist or have been linked to the document type, the method 500 proceeds to operation 510, where the document processing service system 134 causes data extraction to be performed by the LLM. For example, the document pro-cessing service system 134 locates a data extraction schema or user instruction that indicates which features are to be extracted from the document, but it fails to locate one or more extraction models that are designated for such extrac-tion.

The document processing service system 134 then gen-erates additional prompt data that includes a feature extrac-tion instruction and transmits the additional prompt data to the LLM. For example, the additional prompt data provides the LLM with a list of the features of interest and an instruction to identify and return their values as outputs. Accordingly, in such cases, the LLM is leveraged, within an integrated process, as a data extraction tool in addition to its use as a classification tool. The data objects returned by the LLM are presented at the user device 106.

If, at decision operation 508, the document processing service system 134 identifies a suitable data extraction schema with one or more designated extraction models, the method 500 proceeds to operation 512, where data extrac-tion is performed using the one or more extraction models (e.g., as described with reference to FIG. 4). As mentioned, where a data extraction schema defines multiple features, different extraction models can be run to extract the respec-tive features, for example, based on a mapping between features and corresponding extraction models.

In other examples, a data extraction schema defines multiple features, and only a first subset of the features are supported by one or more extraction models. A second subset of the features thus does not have a designated extraction model that the document processing service sys-tem 134 can trigger for extraction. In such cases, the document processing service system 134 may cause extrac-tion to be performed by the one or more designated extrac-tion models for the first subset (e.g., similar to operation 512, but only for a subset of the features) while extraction is performed by the LLM for the second subset (e.g., similar to operation 510, but only for a subset of the features).

Referring back to FIG. 5, from operation 512, the method 500 proceeds to decision operation 514, where the document processing service system 134 determines whether the user 108 has rejected (or otherwise queried) any of the extraction results as obtained via the extraction models. If the docu-ment processing service system 134 determines that extrac-tion results were rejected (e.g., by user input provided via the user device 106 requesting a "retry" operation), the document processing service system 134 automatically gen-erates and transmits additional prompt data that includes a feature extraction instruction to the LLM. The LLM thus performs another round of extraction (at operation 516) with respect to features that were rejected by the user 108 after extraction by one or more extraction models, thereby increasing the likelihood that the user 108 will obtain satisfactory results. If, at decision operation 514, the docu-ment processing service system 134 determines that no results were rejected, it does not perform operation 516. The method 500 concludes at closing loop operation 518.

Examples described herein thus combine the classification of documents using generative AI with subsequent extraction of relevant information from those documents using extraction models and/or generative AI. In some examples, computing resources can be saved by utilizing more lightweight extraction models for data extraction where such extraction models support a particular document type of feature, and only utilizing a generative machine learning model, such as an LLM, for extraction in the event that an extraction model is not available or in the event that initial extraction results are to be supplemented or improved.

FIG. 6 illustrates a user interface 600 that presents document classification and data extraction results, according to some examples. In some examples, the user interface 600 is presented by the web client 114 of FIG. 1. The user interface 600 may be presented on a display or screen of the user device 106, or in another suitable manner.

The user interface 600 presents results of an automated classification process and an automated data extraction process. For example, the method 300 of FIG. 3 is used to classify a document 606, after which the method 400 of FIG. 4 is used to extract values of features from the same document, with the results being presented in the user interface 600.

The user interface 600 includes a document viewer section 602 where the user 108 can view the document 606, and a results section 604 where the user 108 can view or interact with the results. In the document viewer section 602, located on the left side of the user interface 600, the user 108 can view and navigate the document 606 that has been classified and from which the values have been extracted. For example, where the document 606 has multiple pages, the user 108 can navigate between different pages.

The results section 604 shows a document name 608 (e.g., a file name of the document 606 as uploaded by the user 108) and a document classification 610. In FIG. 6, the document classification 610 is "Debit Note."

The results section 604 further shows extraction results 620. The extraction results 620 include feature names 622 of the features identified in the relevant data extraction schema, as well as a value 624 extracted for each feature. In addition, the extraction results 620 include a confidence level 626 returned by the relevant extraction model for each feature. The confidence level 626 indicates a level of confidence in the accuracy of the corresponding value 624. For example, "Green" indicates a high level of confidence, "Orange" indicates a medium level of confidence, and "Red" (not shown in FIG. 6) indicates a low level of confidence.

The user 108 can use the user interface 600 to compare the value 624 obtained by a model for a particular feature to the actual values displayed in the document viewer section 602. In the example of FIG. 6, these include the document number 612, the net amount 614, the recipient name 616, and the recipient address 618 of the debit note, and it will be noted that the values in the extraction results 620 are shown as correctly extracted by the model or models.

Referring specifically to the document classification 610, a classification schema for the document 606 may indicate that the document 606 should be classified as either a debit note or a credit note, and that the values for document number 612 and net amount 614 should be used to make the decision. In some examples, a generative machine learning model is fine-tuned on labeled data to improve its ability to correctly predict that a given document is either a debit note or a credit note by specifically analyzing the document number 612 and the net amount 614.

It is noted that the features extracted by the one or more extraction models are not necessarily the same set of features used to classify the document 606. For example, the generative machine learning model may use the document number 612 and net amount 614 for classification, while values for more than two features are subsequently extracted, as shown in the results section 604.

In some examples, and as shown in FIG. 6, the user interface 600 allows the user 108 to consider the entire document 606 in context in the document viewer section 602, including other data objects 628 and 630 that were not specifically included in the classification or extraction processes, as the user 108 might, for example, wish to update the classification schema or data extraction schema to add further features, modify existing features, or the like. Furthermore, the extraction results 620 include a retry extraction option 632 that is provided next to each extraction result. The user 108 can select the retry extraction option 632 to initiate a new extraction operation for that feature.

For example, if the user 108 detects that a particular value was extracted incorrectly, the user 108 can select the retry extraction option 632 for the corresponding feature. As discussed elsewhere, in some examples, selection of the retry extraction option 632 can cause the document processing service system 134 to automatically perform generative AI-driven extraction to supplement or replace the initial result that was obtained using an extraction model. In some examples, a similar user interface can be provided to enable the user 108 to make annotations or corrections (e.g., where a classification or extraction result is incorrect).

FIG. 7 illustrates operations of a method 700 suitable for training an LLM and multiple extraction models, according to some examples. By way of example and not limitation, aspects of the method 700 may be performed by components, devices, systems, network, or databases shown in FIG. 1 and FIG. 2, and they may accordingly be referenced below.

In the example method 700 of FIG. 7, a user (e.g., a user representing an enterprise) is interested in creating an automated pipeline that can be run to classify documents and extract values of two particular features from the documents. For example, the user is interested in creating an automated pipeline that can be run to classify uploaded documents as being either credit notes or debit notes, and extract the value for "Document Number" and the value for "Net Amount" from each document. It is noted that the method 700 of FIG. 7 is merely an illustrative example, and that various other classification and extraction schemas, and other models or combinations of models, can be implemented using similar techniques.

The method 700 commences at opening loop operation 702, and proceeds to operation 704 where the AI and machine learning system 140 accesses first training data for fine-tuning a pre-trained LLM. The first training data includes sample documents (or sample document content) and annotations or labels that indicate the correct class of each sample document. In some examples, the first training data also includes annotations that identify features that are to be used to classify the documents (e.g., "Net Amount" should be used to decide whether a document is a debit note or a credit note).

In some examples, the method 700 includes, for one or more of the sample documents, (a) annotating and/or correcting data related to a class that needs to be trained, and (b) saving/confirming the "ground truth" for the one or more of the sample documents. The document processing service system 134 or AI and machine learning system 140 may provide, via a suitable user interface, an annotation tool to facilitate annotation and/or correction during or prior to a training job.

At operation 706, the LLM is fine-tuned by the AI and machine learning system 140 using the first training data. Although LLMs are generally already trained on an extensive set of documents or other data that can help in classification tasks, fine-tuning can enable the LLM to perform classification more accurately. Accordingly, an existing "base" LLM is modified on a parameter level. During fine-tuning, the LLM learns to predict the class (e.g., document type) of a document more accurately based on the annotated or labeled training data.

Fine-tuning may involve setting appropriate hyperparameters such as learning rate, batch size, and number of epochs, creating data loaders for handling batching during training and validation, and establishing a training loop for forward passes, loss computation, and/or backpropagation. After training, the LLM may undergo evaluation using a separate validation set to assess metrics such as accuracy and precision. Adjustments to hyperparameters or additional training rounds may be performed based on the evaluation results to optimize performance. Once the LLM meets desired criteria, it may be saved and deployed for production. For example, the fine-tuned LLM is integrated into or linked with the AI and machine learning system 140.

At operation 708, once fine-tuning and deployment is complete, the fine-tuned LLM can be linked to the relevant classification schema. For example, a model deployment identifier of the fine-tuned LLM can be included in or associated with the classification schema. In this way, when a user of the document processing service system 134 subsequently selects the classification schema, the fine-tuned LLM is automatically utilized for classification purposes. In some examples, a model deployment identifier includes or is associated with a link (e.g., a web address) that identifies and allows the AI and machine learning system 140 to communicate with, locate, and/or run a machine learning component.

The method 700 proceeds to operation 710, where the AI and machine learning system 140 accesses second training data. The second training data is provided to train a first extraction model to extract data objects associated with a first feature of interest (e.g., "Document Number"). The second training data includes sample documents with annotations indicating the feature of interest.

In some examples, the method 700 includes, for one or more of the sample documents, (a) annotating and/or correcting data related to the feature that needs to be trained, and (b) saving/confirming the "ground truth" for the one or more of the sample documents. The document processing service system 134 or AI and machine learning system 140 may provide, via a suitable user interface, an annotation tool to facilitate annotation and/or correction during or prior to a training job.

At operation 712, the first extraction model is trained by the AI and machine learning system 140 on the second training data. In some examples, the extraction model is more lightweight than an LLM, and is thus less computationally intensive or expensive to run. For example, the AI and machine learning system 140 is used to train a CNN for extraction of "Document Number" values from documents. Once training is complete, the first extraction model is deployed, and the data extraction schema for the document type "Debit Note" is updated, at operation 714, to map the first extraction model to its corresponding feature. For example, a model deployment identifier of the first extraction model is mapped to "Document Number" in the data extraction schema.

At operation 716, the AI and machine learning system 140 accesses third training data. The third training data is provided to train a second extraction model to extract data objects associated with a second feature of interest (e.g., "Net Amount"). The third training data includes sample documents with suitable annotations.

At operation 718, the second extraction model is trained by the AI and machine learning system 140 on the third training data. For example, the AI and machine learning system 140 is used to train a CNN for extraction of "Net Amount" values. Once training is complete, the second extraction model is deployed, and the data extraction schema for the document type "Debit Note" is updated, at operation 720, to map the second extraction model to its corresponding feature. For example, a model deployment identifier of the first extraction model is mapped to "Net Amount" in the same data extraction schema that also contains the "Document Number" feature.

Referring more generally to extraction models or LLMs, in some examples, a model deployment identifier is transmitted to the document processing service system 134 or the AI and machine learning system 140 by the user device 106 of FIG. 1 or a third-party device, e.g., where a training job is performed outside of the server system 104 of FIG. 1. In other words, training of one or more of the machine learning models associated need not necessarily be performed by the server system 104. The document processing service system 134 might, for instance, obtain or retrieve a model deployment identifier from a training platform coupled to and associated with the server system 104, or from a third-party training platform, and map the model deployment identifier to the feature in the relevant schema.

As mentioned, in some examples, an extraction model (such as the first and second extraction models described above) is a feature-specific model which is exclusively trained for extraction associated with one or more features. Different models may thus be trained to analyze and predict values for different features.

Once the fine-tuned LLM, the first extraction model, and the second extraction model are deployed, they can be used as part of the document processing service provided by the document processing service system 134 (at operation 722). During operation, to route a classification or extraction request to the appropriate model, the document processing service system 134 may use the model deployment identifier to access/retrieve a machine learning model uniform resource locator (URL), and thereby locate the model.

The document processing service system 134 may transmit a payload, including the relevant inputs and/or prompts, to the URL, in response to which the model may perform classification/extraction/prediction and return its results. The machine learning model URL may provide access to a web service, provided by the application server 128 or another server. The web service may deploy a trained machine learning model to serve inference with respect to requests originating from the web client 114. The method 700 concludes at closing loop operation 724.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving, via a user interface presented at a user device, first user input and second user input, the first user input comprising a document and the second user input identifying a classification schema; retrieving the classification schema to obtain first prompt content; generating prompt data comprising the first prompt content and second prompt content that includes, a document classification instruction; causing processing of the prompt data and document content of the document by a large language model (LLM) to obtain a classification result for the document; and causing presentation, via the user interface, of the classification result.

In Example 2, the subject matter of Example 1 includes, the operations further comprising: identifying one or more features in the document; extracting, by one or more extraction models and based on a data extraction schema associated with the document, one or more data objects associated with the one or more features from the document; and causing presentation, via the user interface, of the one or more data objects.

In Example 3, the operations further comprising: selecting, based on the classification result, the data extraction schema from among a plurality of data extraction schemas; and identifying, using the data extraction schema, the one or more extraction models.

In Example 4, the subject matter of any of Examples 1-3 includes, wherein each of the one or more extraction models is trained to extract, from a given document, a data object associated with a predetermined feature.

In Example 5, the subject matter of any of Examples 1-4 includes, wherein the one or more features comprise a plurality of features, the one or more extraction models comprise a plurality of extraction models, and the plurality of extraction models perform the extraction on respective predetermined features from among the plurality of features.

In Example 6, the subject matter of any of Examples 1-5 includes, wherein the one or more data objects comprise a first data object associated with a first feature of the one or more features, and the operations further comprise, after causing presentation of the one or more data objects: receiving, via the user interface, third user input indicative of a rejection of at least the first data object; in response to receiving the third user input, causing processing, by the LLM, of a feature extraction instruction together with the document content to extract a second data object associated with the first feature; and causing presentation, via the user interface, of the second data object.

In Example 7, the subject matter of any of Examples 1-6 includes, wherein the prompt data further comprises third prompt content that includes a feature extraction instruction, and the processing by the LLM further comprises extracting, based on the third prompt content, one or more data objects associated with one or more features in the document.

In Example 8, the subject matter of any of Examples 1-7 includes, the operations further comprising: causing presentation, via the user interface, of the one or more data objects.

In Example 9, the subject matter of any of Examples 1-8 includes, wherein the classification schema comprises a set of classes, and the document classification instruction comprises an instruction to select the classification result from the set of classes.

In Example 10, the subject matter of any of Examples 1-9 includes, the operations further comprising, prior to receiving the first user input and the second user input, fine-tuning the LLM using training data that identifies, for each of a plurality of sets of training data items, a class from among the set of classes.

In Example 11, the subject matter of any of Examples 1-10 includes, wherein the classification schema comprises a set of classes and one or more features, and the document classification instruction comprises an instruction to use one or more data objects associated with the one or more features in the document content to select the classification result from the set of classes.

In Example 12, the subject matter of any of Examples 1-11 includes, the operations further comprising: identifying a plurality of classification schemas associated with a user account of a user associated with the user device; and causing presentation, via the user interface, of a plurality of options, wherein each of the plurality of options corresponds to a respective one of the plurality of classification schemas associated with the user account, and the second user input comprises a selection of an option, from among the plurality of options, that corresponds to the classification schema.

In Example 13, the subject matter of any of Examples 1-12 includes, wherein the LLM comprises a transformer-based LLM, and the one or more extraction models comprise one or more convolutional neural networks (CNNs).

In Example 14, the subject matter of any of Examples 1-13 includes, wherein the prompt data comprises text, and the operations further comprise: causing preprocessing of the document to obtain, from the document, the document content in text format.

Example 15 is a method comprising: receiving, by one or more processors, first user input and second user input via a user interface presented at a user device, the first user input comprising a document and the second user input identifying a classification schema; retrieving, by the one or more processors, the classification schema to obtain first prompt content; generating, by the one or more processors, prompt data comprising the first prompt content and second prompt content that includes, a document classification instruction; causing, by the one or more processors, processing of the prompt data and document content of the document by a large language model (LLM) to obtain a classification result for the document; and causing, by the one or more processors, presentation of the classification result via the user interface.

In Example 16, the subject matter of Example 15 includes, identifying, by the one or more processors, one or more features in the document; extracting, by one or more extraction models and based on a data extraction schema associated with the document, one or more data objects associated with the one or more features from the document; and causing presentation, via the user interface, of the one or more data objects.

In Example 17, the subject matter of any of Examples 15-16 includes, wherein the prompt data further comprises third prompt content that includes a feature extraction instruction, and the processing by the LLM further comprises extracting, based on the third prompt content, one or more data objects associated with one or more features in the document.

Example 18 is one or more non-transitory computer-readable media storing computer-executable instructions that, when executed by a computing system, cause the computing system to perform operations comprising: receiving, via a user interface presented at a user device, first user input and second user input, the first user input comprising a document and the second user input identifying a classification schema; retrieving the classification schema to obtain first prompt content; generating prompt data comprising the first prompt content and second prompt content that includes, a document classification instruction; causing processing of the prompt data and document content of the document by a large language model (LLM) to obtain a classification result for the document; and causing presentation, via the user interface, of the classification result.

In Example 19, the subject matter of Example 18 includes, the operations further comprising: identifying one or more features in the document; extracting, by one or more extraction models and based on a data extraction schema associated with the document, one or more data objects associated with the one or more features from the document; and causing presentation, via the user interface, of the one or more data objects.

In Example 20, the subject matter of any of Examples 18-19 includes, wherein the prompt data further comprises third prompt content that includes a feature extraction instruction, and the processing by the LLM further comprises extracting, based on the third prompt content, one or more data objects associated with one or more features in the document.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 8:
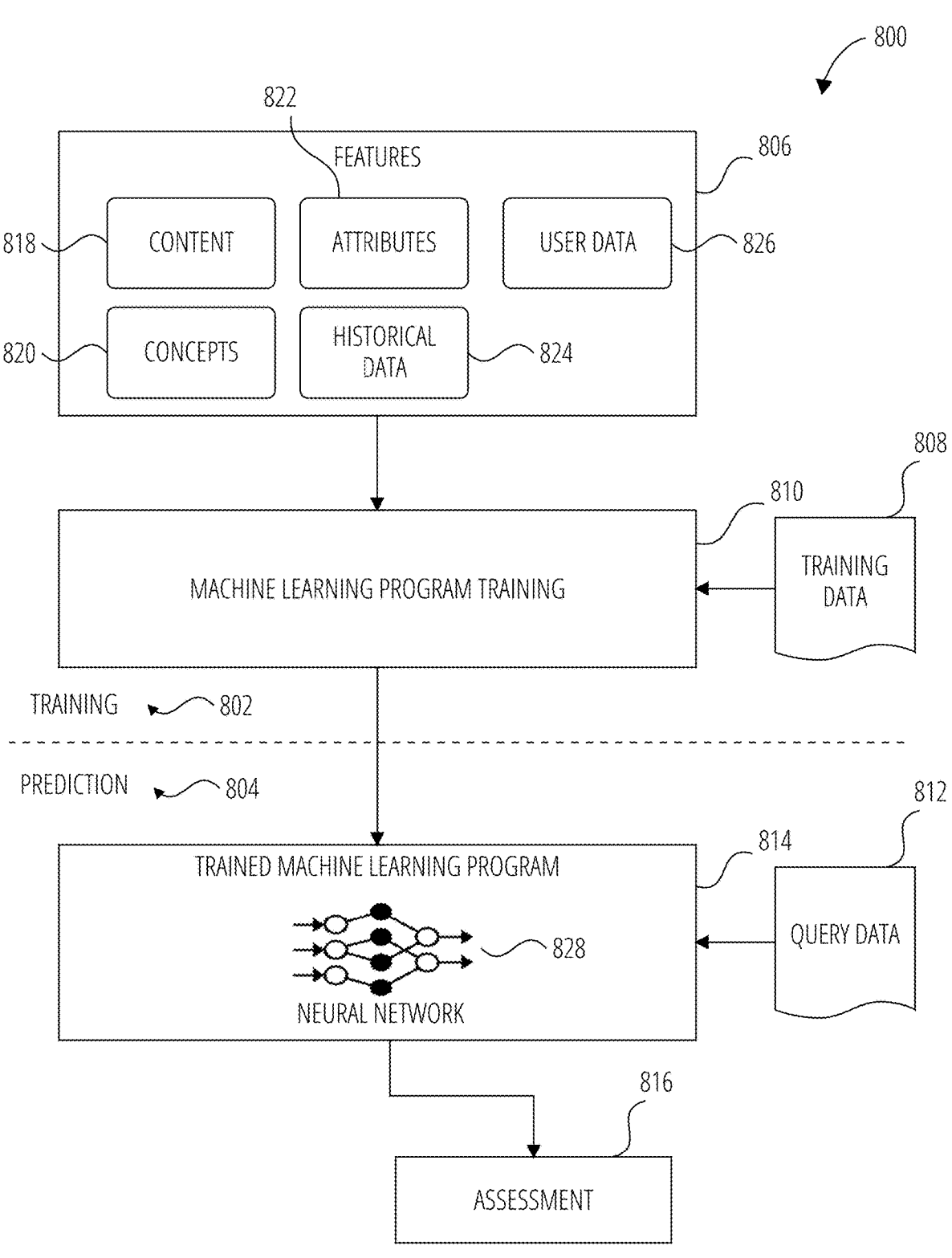
FIG. 8 diagrammatically illustrates training and use of a machine learning program, according to some examples.

FIG. 8 is a block diagram showing a machine learning program 800, according to some examples. Machine learning programs, also referred to as machine learning algorithms or tools, may be used as part of the systems described herein to perform one or more operations.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 808 in order to make data-driven predictions or decisions expressed as outputs or assessments (e.g., assessment 816). Although examples are presented with respect to a few machine learning tools, at least some principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 800 supports two types of phases, namely training phases 802 and prediction phases 804. In training phases 802, supervised learning, unsupervised or reinforcement learning may be used. For example, the machine learning program 800 (1) receives features 806 (e.g., as structured or labeled data in supervised learning)

and/or (2) identifies features 806 (e.g., unstructured or unlabeled data for unsupervised learning) in training data 808. In prediction phases 804, the machine learning program 800 uses the features 806 for analyzing query data 812 to generate outcomes or predictions, as examples of an assessment 816.

In the training phase 802, feature engineering is used to identify features 806 and may include identifying informative, discriminating, and independent features for the effective operation of the machine learning program 800 in pattern recognition, classification, and regression. In some examples, the training data 808 includes labeled data, which is known data for pre-identified features 806 and one or more outcomes. Each of the features 806 may be a variable or attribute, such as individual measurable property of a process, article, system, or phenomenon represented by a data set (e.g., the training data 808). Features 806 may also be of different types, such as numeric features, strings, and graphs, and may include one or more of content 818, concepts 820, attributes 822, historical data 824 and/or user data 826, merely for example.

The concept of a feature in this context is related to that of an explanatory variable used in statistical techniques such as linear regression. Choosing informative, discriminating, and independent features is important for the effective operation of the machine learning program 800 in pattern recognition, classification, and regression. Features may be of different types, such as numeric features, strings, and graphs.

In training phases 802, the machine learning program 800 uses the training data 808 to find correlations among the features 806 that affect a predicted outcome or assessment 816.

With the training data 808 and the identified features 806, the machine learning program 800 is trained during the training phase 802 at machine learning program training 810. The machine learning program 800 appraises values of the features 806 as they correlate to the training data 808. The result of the training is the trained machine learning program 814 (e.g., a trained or learned model).

Further, the training phases 802 may involve machine learning, in which the training data 808 is structured (e.g., labeled during preprocessing operations), and the trained machine learning program 814 implements a relatively simple neural network 828 capable of performing, for example, classification and clustering operations. In other examples, the training phase 802 may involve deep learning, in which the training data 808 is unstructured, and the trained machine learning program 814 implements a deep neural network 828 that is able to perform both feature extraction and classification/clustering operations.

A neural network 828 generated during the training phase 802, and implemented within the trained machine learning program 814, may include a hierarchical (e.g., layered) organization of neurons. For example, neurons (or nodes) may be arranged hierarchically into a number of layers, including an input layer, an output layer, and multiple hidden layers. Each of the layers within the neural network 828 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 828 may be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a CNN, or a Recursive Neural Network (RNN), merely for example.

During prediction phases 804, the trained machine learning program 814 is used to perform an assessment. Query data 812 is provided as an input to the trained machine learning program 814, and the trained machine learning program 814 generates the assessment 816 as output, responsive to receipt of the query data 812.

In some examples, the trained machine learning program 814 may comprise a generative AI model. Generative AI is a term that may refer to AI that can create new content. For example, generative AI can produce text, images, video, audio, code, or synthetic data.

Some of the techniques that may be used in generative AI are:

GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer-based models can handle sequential data, such as text or speech, as well as non-sequential data, such as images or code. For example, the LLM 126 of FIG. 1 or another LLM referred to herein may be a transformer model, or may be based on a transformer model. Non-limiting examples of LLMs that use transformer models include GPT-4 (Generative Pre-trained Transformer 4) developed by OpenAI™, BERT (Bidirectional Encoder Representations from Transformers) developed by Google™, LLaMA (Large Language Model Meta AI) developed by Meta™, PaLM2 (Pathways Language Model 2) developed by Google™, and Claude 3 developed by Anthropic™.

In generative AI examples, the assessment 816 generated as a response or output by the trained machine learning program 814 may include predictions, translations, summaries, answers to questions, suggestions, media content, or combinations thereof.

In some examples, a machine learning model may be fine-tuned. The term "fine-tuning," as used herein, generally refers to a process of adapting a pre-trained or "base" machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 9:
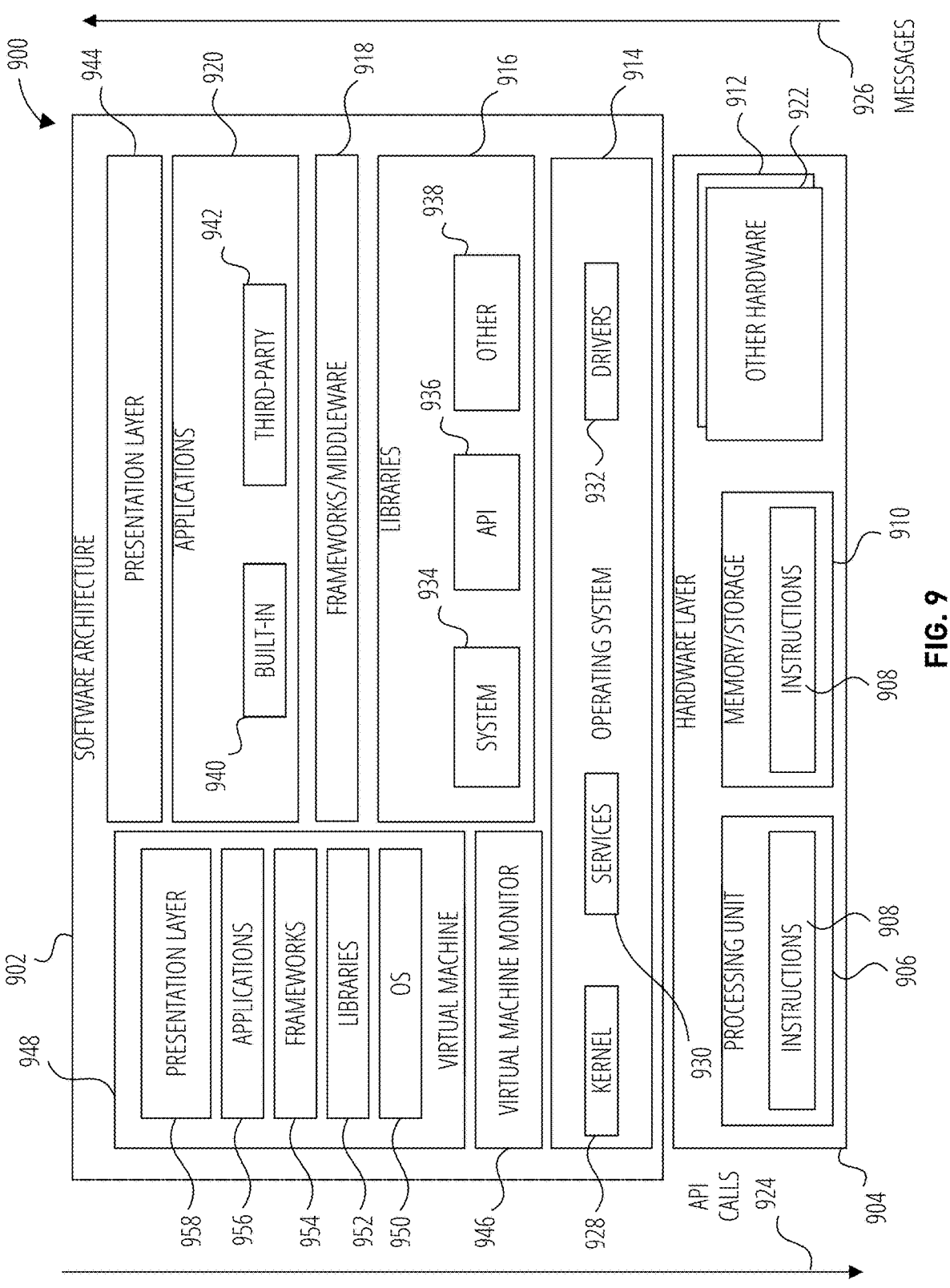
FIG. 9 is a block diagram showing a software architecture for a computing device, according to some examples.

FIG. 9 is a block diagram 900 showing a software architecture 902 for a computing device, according to some examples. The software architecture 902 may be used in conjunction with various hardware architectures, for example, as described herein. FIG. 9 is merely a non-limiting illustration of a software architecture, and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912 and other hardware 922 which represent any other hardware of the hardware layer 904, such as the other hardware illustrated as part of the software architecture 902.

In the architecture of FIG. 9, the software architecture 902 may be conceptualized as a stack of layers where each layer provides particular functionality. For example, the software architecture 902 may include layers such as an operating system 914, libraries 916, frameworks/middleware layer 918, applications 920, and presentation layer 944. Operationally, the applications 920 or other components within the layers may invoke API calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the software architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 916 may provide a common infrastructure that may be utilized by the applications 920 or other components or layers. The libraries 916 typically provide functionality that allows other software modules to perform tasks in an easier fashion than to interface directly with the underlying operating system 914 functionality (e.g., kernel 928, services 930 or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks/middleware layer 918 may provide a higher-level common infrastructure that may be utilized by the applications 920 or other software components/modules. For example, the frameworks/middleware layer 918 may provide various graphic user interface (GUI) functions, high-level resource management, high-level location services, and so forth. The frameworks/middleware layer 918 may provide a broad spectrum of other APIs that may be utilized by the applications 920 or other software components/modules, some of which may be specific to a particular operating system or platform.

The applications 920 include built-in applications 940 or third-party applications 942. Examples of representative built-in applications 940 may include, but are not limited to, a contacts application, a browser application, a book reader application, a location application, a media application, a messaging application, or a game application. Third-party applications 942 may include any of the built-in applications as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built in operating system functions (e.g., kernel 928, services 930 or drivers 932), libraries (e.g., system libraries 934, API libraries 936, and other libraries 938), and frameworks/middleware layer 918 to create user interfaces to interact with users of the system. Alternatively, or additionally, in some systems, interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine

948. A virtual machine creates a software environment where applications/modules can execute as if they were executing on a hardware computing device. A virtual machine is hosted by a host operating system (operating system 914) and typically, although not always, has a virtual machine monitor 946, which manages the operation of the virtual machine as well as the interface with the host operating system (e.g., operating system 914). A software architecture executes within the virtual machine 948 such as an operating system 950, libraries 952, frameworks/middleware 954, applications 956 or presentation layer 958. These layers of software architecture executing within the virtual machine 948 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hardwired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 10:
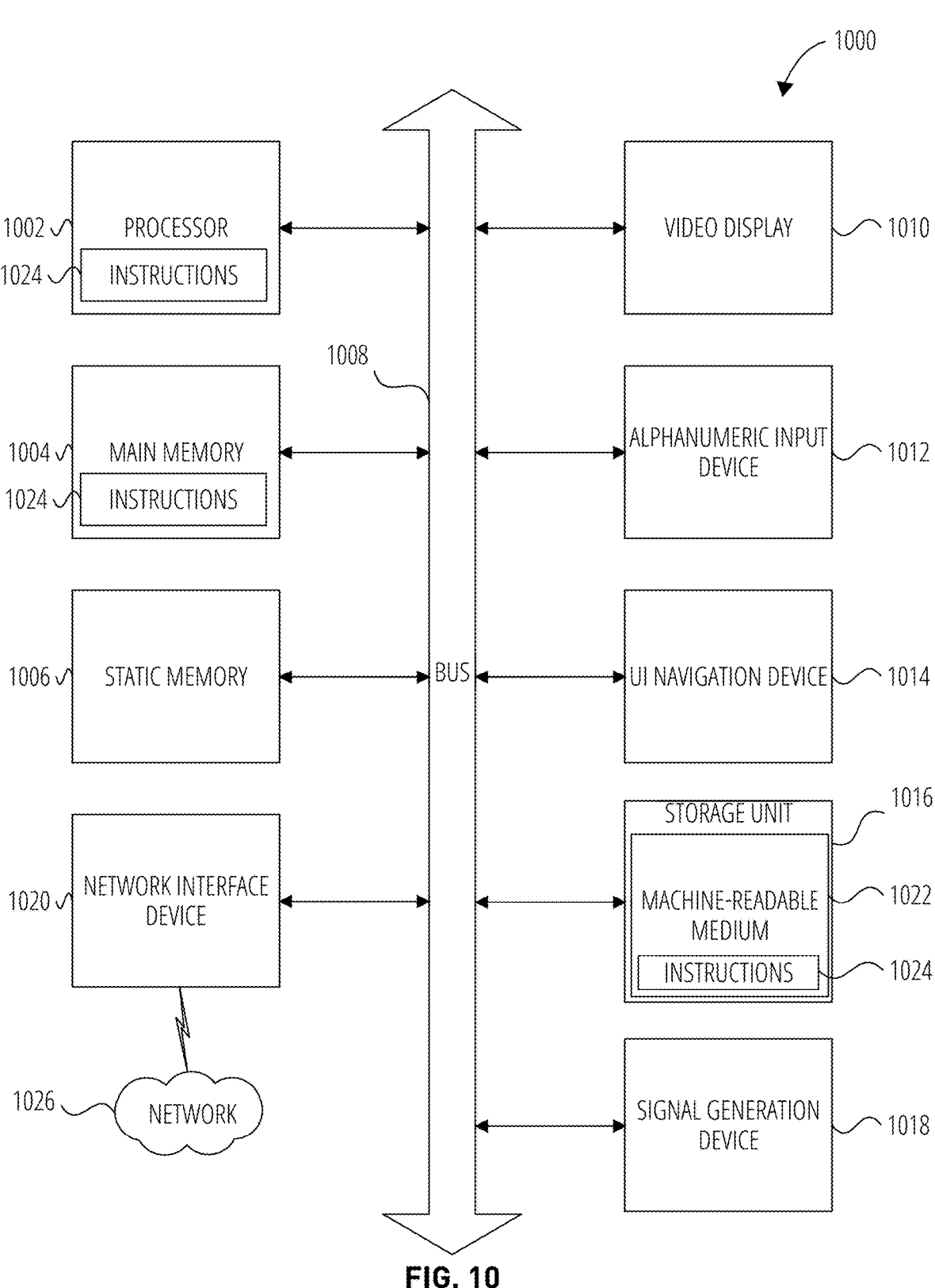
FIG. 10 is a block diagram of a machine in the form of a computer system, according to some examples, within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a GPU, or both), a primary or main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a UI navigation (or cursor control) device 1014 (e.g., a mouse), a storage unit 1016, a signal generation device 1018 (e.g., a speaker), and a network interface device 1020.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 or within the processor 1002 during execution thereof by the computer system 1000, with the main memory 1004 and the processor 1002 also each constituting a machine-readable medium 1022.

While the machine-readable medium 1022 is shown in accordance with some examples to be a single medium, the term "machine-readable medium" may include a single medium or multiple media (e.g., a centralized or distributed database, or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of a machine-readable medium 1022 include non-volatile memory, including by way of example semiconductor memory devices, e.g., erasable programmable read-only memory (EPROM), electrically erasable programmable read-only memory (EE-PROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1024 may further be transmitted or received over a communications network 1026 using a transmission medium. The instructions 1024 may be transmitted using the network interface device 1020 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1024 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:

at least one memory that stores instructions; and one or more processors configured by the instructions to perform operations comprising:

receiving, via a user interface presented at a user device, first user input and second user input, the first user input comprising a document and the second user input identifying a classification schema;

retrieving the classification schema to obtain first prompt content;

generating prompt data comprising the first prompt content and second prompt content that includes a document classification instruction;

causing processing of the prompt data and document content of the document by a Large Language Model (LLM) to obtain a classification result for the document;

extracting, by one or more extraction models, one or more data objects associated with one or more features from the document;

causing presentation, via the user interface, of the classification result and the one or more data objects;

receiving, via the user interface, third user input indicative of a rejection of at least a first data object of the one or more data objects associated with a first feature of the one or more features;

in response to receiving the third user input, causing processing, by the LLM, of a feature extraction instruction together with the document to extract a second data object associated with the first feature; and causing presentation, via the user interface, of the second data object.

2. The system of claim 1, the operations further comprising:

receiving a user-defined data extraction schema that identifies the one or more features to be extracted and links the one or more features to the one or more extraction models.

3. The system of claim 1, the operations further comprising:

selecting, based on the classification result, a data extraction schema from among a plurality of data extraction schemas; and identifying, using the data extraction schema, the one or more extraction models.

4. The system of claim 1, wherein each of the one or more extraction models is trained to extract, from a given document, a data object associated with a predetermined feature.

5. The system of claim 4, wherein the one or more features comprise a plurality of features, the one or more extraction models comprise a plurality of extraction models, and the plurality of extraction models perform the extraction on respective predetermined features from among the plurality of features.

6. The system of claim 1, wherein the first data object and the second data object are extracted by a first extraction model of the one or more extraction models, the first extraction model corresponding to the first feature of the one or more features.

7. The system of claim 1, wherein the prompt data further comprises third prompt content that includes a feature extraction instruction, and the processing by the LLM further comprises extracting, based on the third prompt content, one or more data objects associated with one or more features in the document.

8. The system of claim 1, wherein the third user input comprises a selection of a retry extraction option corresponding to the first feature.

9. The system of claim 1, wherein the classification schema comprises a set of classes, and the document classification instruction comprises an instruction to select the classification result from the set of classes.

10. The system of claim 9, the operations further comprising, prior to receiving the first user input and the second user input, fine-tuning the LLM using training data that identifies, for each of a plurality of sets of training data items, a class from among the set of classes.

11. The system of claim 1, wherein the classification schema comprises a set of classes and one or more features, and the document classification instruction comprises an instruction to use one or more data objects associated with the one or more features in the document content to select the classification result from the set of classes.

12. The system of claim 1, the operations further comprising:

identifying a plurality of classification schemas associated with a user account of a user associated with the user device; and causing presentation, via the user interface, of a plurality of options, wherein each of the plurality of options corresponds to a respective one of the plurality of classification schemas associated with the user account, and the second user input comprises a selection of an option, from among the plurality of options, that corresponds to the classification schema.

13. The system of claim 1, wherein the LLM comprises a transformer-based LLM, and the one or more extraction models comprise one or more Convolutional Neural Networks (CNNs).

14. The system of claim 1, wherein the prompt data comprises text, and the operations further comprise:

causing preprocessing of the document to obtain, from the document, the document content in text format.

15. A method comprising:

receiving, by one or more processors, first user input and second user input via a user interface presented at a user device, the first user input comprising a document and the second user input identifying a classification schema;

retrieving, by the one or more processors, the classification schema to obtain first prompt content;

generating, by the one or more processors, prompt data comprising the first prompt content and second prompt content that includes a document classification instruction;

causing, by the one or more processors, processing of the prompt data and document content of the document by a large language model (LLM) to obtain a classification result for the document;

extracting, by the one or more processors, one or more data objects associated with one or more features from the document by one or more extraction models;

causing, by the one or more processors, presentation of the classification result via the user interface and the one or more data objects;

receiving, by the one or more processors, third user input indicative of a rejection of at least a first data object of the one or more data objects associated with a first feature of the one or more features via the user interface;

in response to receiving the third user input, causing, by the one or more processors, processing of a feature extraction instruction together with the document by the LLM to extract a second data object associated with the first feature; and causing, by the one or more processors, presentation of the second data object via the user interface.

16. The method of claim 15, further comprising:

receiving, by the one or more processors, a user-defined data extraction schema that identifies the one or more features to be extracted and links the one or more features to the one or more extraction models.

17. The method of claim 15, wherein the prompt data further comprises third prompt content that includes a feature extraction instruction, and the processing by the LLM further comprises extracting, based on the third prompt content, one or more data objects associated with one or more features in the document.

18. One or more non-transitory computer-readable media storing computer-executable instructions that, when executed by a computing system, cause the computing system to perform operations comprising:

receiving, via a user interface presented at a user device, first user input and second user input, the first user input comprising a document and the second user input identifying a classification schema;

retrieving the classification schema to obtain first prompt content;

generating prompt data comprising the first prompt content and second prompt content that includes a document classification instruction;

causing processing of the prompt data and document content of the document by a Large Language Model (LLM) to obtain a classification result for the document;

extracting, by one or more extraction models, one or more data objects associated with one or more features from the document;

causing presentation, via the user interface, of the classification result and the one or more data objects;

receiving, via the user interface, third user input indicative of a rejection of at least a first data object of the one or more data objects associated with a first feature of the one or more features;

in response to receiving the third user input, causing processing, by the LLM, of a feature extraction instruction together with the document to extract a second data object associated with the first feature; and causing presentation, via the user interface, of the second data object.

19. The one or more non-transitory computer-readable media of claim 18, the operations further comprising:

receiving a user-defined data extraction schema that identifies the one or more features to be extracted and links the one or more features to the one or more extraction models.

20. The one or more non-transitory computer-readable media of claim 18, wherein the prompt data further comprises third prompt content that includes a feature extraction instruction, and the processing by the LLM further comprises extracting, based on the third prompt content, one or more data objects associated with one or more features in the document.

* * * * *